(12) United States Patent
Min et al.

(10) Patent No.: US 11,375,469 B2
(45) Date of Patent: Jun. 28, 2022

(54) ELECTRONIC DEVICE FOR DETERMINING PATH OF LINE OF SIGHT (LOS) AND METHOD FOR THE SAME

(71) Applicant: Samsung Electronics Co., Ltd., Gyeonggi-do (KR)

(72) Inventors: Hyunkee Min, Gyeonggi-do (KR); Junsu Choi, Gyeonggi-do (KR); Chiho Kim, Gyeonggi-do (KR); Junghun Lee, Gyeonggi-do (KR); Taehun Lim, Gyeonggi-do (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 148 days.

(21) Appl. No.: 16/939,326

(22) Filed: Jul. 27, 2020

(65) Prior Publication Data
US 2021/0092703 A1   Mar. 25, 2021

(30) Foreign Application Priority Data
Sep. 20, 2019   (KR) .......................... 10-2019-0115981

(51) Int. Cl.
*H04W 56/00*   (2009.01)
*H04B 7/0456*   (2017.01)
*H04W 64/00*   (2009.01)

(52) U.S. Cl.
CPC ...... *H04W 56/0075* (2013.01); *H04B 7/0469* (2013.01); *H04W 56/001* (2013.01); *H04W 64/003* (2013.01)

(58) Field of Classification Search
CPC ........... H04W 56/0075; H04W 56/001; H04W 64/003; H04W 64/006; H04B 7/0469;
(Continued)

(56) References Cited

U.S. PATENT DOCUMENTS

| 10,278,151 B2 | 4/2019 | Venkatraman et al. |
| 2009/0017782 A1 | 1/2009 | Monat et al. |

(Continued)

FOREIGN PATENT DOCUMENTS

| EP | 2015103 B1 | 6/2019 |
| KR | 10-2009-0073657 A | 7/2009 |

(Continued)

OTHER PUBLICATIONS

International Search Report dated Oct. 28, 2020.

*Primary Examiner* — Ashley Shivers
(74) *Attorney, Agent, or Firm* — Cha & Reiter, LLC

(57) ABSTRACT

An electronic device according to an embodiment includes an mmWave communication module and a processor. The processor is configured to receive a first signal transmitted by a first external electronic device, identify a distance of a transmission path of the first signal, transmit a second signal, receive a third signal obtained when the second signal is reflected, identify a distance of a transmission path of the second signal based on a difference between a transmission time of the second signal and a reception time of the third signal, and determine whether the transmission path of the first signal is a line of sight (LoS) path between the electronic device and the first external electronic device based on a difference between the distance of the transmission path of the first signal and the distance of the transmission path of the second signal. In addition, other embodiments are possible.

20 Claims, 20 Drawing Sheets

(58) Field of Classification Search
CPC .... H04B 7/0695; H04B 7/088; H04B 17/101; G01S 5/06; G01S 5/0284
See application file for complete search history.

(56) References Cited

U.S. PATENT DOCUMENTS

| | | |
|---|---|---|
| 2010/0215088 A1 | 8/2010 | Park et al. |
| 2011/0312421 A1 | 12/2011 | Rofougaran et al. |
| 2017/0212208 A1 | 7/2017 | Baek et al. |
| 2018/0115439 A1* | 4/2018 | Bhatti ................. H04L 25/0204 |
| 2019/0123938 A1 | 4/2019 | Min et al. |
| 2019/0141556 A1* | 5/2019 | Kasher ................. H04W 24/10 |
| 2019/0200339 A1 | 6/2019 | Handte et al. |
| 2019/0271775 A1* | 9/2019 | Zhang ................... G01S 13/003 |
| 2021/0084514 A1* | 3/2021 | Lev ..................... H04W 40/205 |

FOREIGN PATENT DOCUMENTS

| | | |
|---|---|---|
| KR | 10-2010-0097285 A | 9/2010 |
| KR | 10-2019-0043765 A | 4/2019 |
| WO | 2018/046271 A1 | 3/2018 |

* cited by examiner

ELECTRONIC DEVICE FOR DETERMINING PATH OF LINE OF SIGHT (LOS) AND METHOD FOR THE SAME

CROSS-REFERENCE TO RELATED APPLICATION(S)

This application is based on and claims priority under 35 U.S.C. 119 to Korean Patent Application No. 10-2019-0115981, filed on Sep. 20, 2019, in the Korean Intellectual Property Office, the disclosure of which is herein incorporated by reference in its entirety.

BACKGROUND

1) Field

One or more embodiments disclosed herein generally relate to an electronic device and an operation method of the electronic device, and in particular, relate to an electronic device that determines whether a transmission path of a signal provided between the electronic device and an external electronic device is a line of sight (LoS) path.

2) Description of Related Art

Various electronic devices such as smart phones, tablet PCs, portable multimedia players (PMPs), personal digital assistants (PDAs), laptop personal computers (PCs), wearable devices, and the like have become increasingly common.

Recently, in the development of wireless communication technologies, the technique of performing beamforming using a plurality of antennas is frequently deployed. Beamforming is a technique of outputting signals using a plurality of antennas in such a manner that the output signals are directed in a specific direction. To accomplish this, a beam having a high signal gain in a specific direction is formed. Beamforming, which is one of several techniques implemented by multiple antennas, has the benefit of better connection reliability in a wireless environment. Again, this is accomplished by using multiple antennas in the receiver or transmitter.

An electronic device supporting beamforming may identify an angle of arrival (AoA) of a signal transmitted by an external electronic device and may transmit a signal to the external electronic device in a direction corresponding to the identified AOA. Also, the electronic device may estimate the position of the external electronic device based on the transmission time of the signal transmitted by the external electronic device.

The above information is presented as background information only to assist with an understanding of the disclosure. No determination has been made, and no assertion is made, as to whether any of the above might be applicable as prior art with regard to the disclosure.

SUMMARY

The signal received by the electronic device from the external electronic device may be a signal transmitted through a line of sight (LoS) through which the electronic device and the external electronic device are connected by a virtual straight line or a signal reflected by an external object.

When the electronic device performs an operation related to the external electronic device based on the signal reflected by the external object, a problem may arise in that it may be difficult to perform the operation due to an incorrect position of the external electronic device.

An electronic device and an operation method of the electronic device according to certain embodiments are to identify whether a signal received by the electronic device from an external electronic device is a signal transmitted through an LoS path.

An electronic device according to an embodiment may include: an mmWave communication module configured to perform first communication with a first external electronic device using a first communication scheme; a first antenna array in which antennas outputting signals of the first communication scheme are arranged; a second antenna array in which antennas receiving the signals of the first communication scheme are arranged; and a processor, wherein the processor is configured to receive a first signal transmitted by the first external electronic device, to identify a distance of a transmission path of the first signal based on time information included in the first signal, to transmit a second signal by using the first antenna array, to receive a third signal obtained when the second signal is reflected by using the second antenna array, to identify a distance of a transmission path of the second signal based on a difference between a transmission time of the second signal and a reception time of the third signal, and to determine whether the transmission path of the first signal is a line of sight (LoS) path between the electronic device and the first external electronic device based on a difference between the distance of the transmission path of the first signal and the distance of the transmission path of the second signal.

An electronic device according to an embodiment may include: an mmWave communication module configured to perform first communication with a first external electronic device using a first communication scheme; a first antenna array in which antennas transmitting signals of the first communication scheme are arranged; a second antenna array in which antennas receiving the signals of the first communication scheme are arranged; and a processor, wherein the processor is configured to transmit a fine timing measurement (FTM) request signal requesting FTM by using the first antenna array, to receive a reflected signal obtained when the FTM request signal is reflected by an external object, by using the second antenna array, to identify a distance of a transmission path of the FTM request signal based on a difference between a transmission time of the FTM request signal included in the reflected signal and a reception time of the reflected signal, to receive a first signal that responds to the FTM request signal transmitted by the first external electronic device and identify a distance of a transmission path of the first signal based on time information included in the first signal, and to determine whether the transmission path of the first signal is an LoS path between the electronic device and the first external electronic device based on a difference between the distance of the transmission path of the FTM request signal and the distance of the transmission path of the first signal.

An operation method of an electronic device according to an embodiment may include: receiving a first signal transmitted by a first external electronic device; identifying a distance of a transmission path of the first signal based on time information included in the first signal; transmitting a second signal by using a first antenna array; receiving a third signal obtained when the second signal is reflected by using a second antenna array; identifying a distance of a transmission path of the second signal based on a difference between a transmission time of the second signal and a reception time of the third signal; and determining whether the transmission path of the first signal is an LoS path between the electronic device and the first external electronic device based on a difference between a distance of the transmission path of the first signal and a distance of the transmission path of the second signal.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

The electronic device and the operation method of the electronic device according to certain embodiments may identify whether a transmission path of a signal transmitted by an external electronic device is an LoS path based on the difference between the distance of a transmission path of a first signal transmitted by the external electronic device and the distance of a second signal transmitted by the electronic device. If the electronic device can determine that the transmission path is an LoS path, it can then implement accurate position measurement of the external electronic device.

The electronic device and the operation method of the electronic device according to certain embodiments may implement accurate position measurement of the external electronic device, thereby improving the accuracy of operations related to the position of the external electronic device.

The electronic device and the operation method of the electronic device according to certain embodiments may identify whether an external object existing in the path between the electronic device and the external electronic device is removed and may transmit a signal through the LoS path between the electronic device and the external electronic device when the object is removed, thereby improving the quality of signal transmission and reception.

Figure 1:
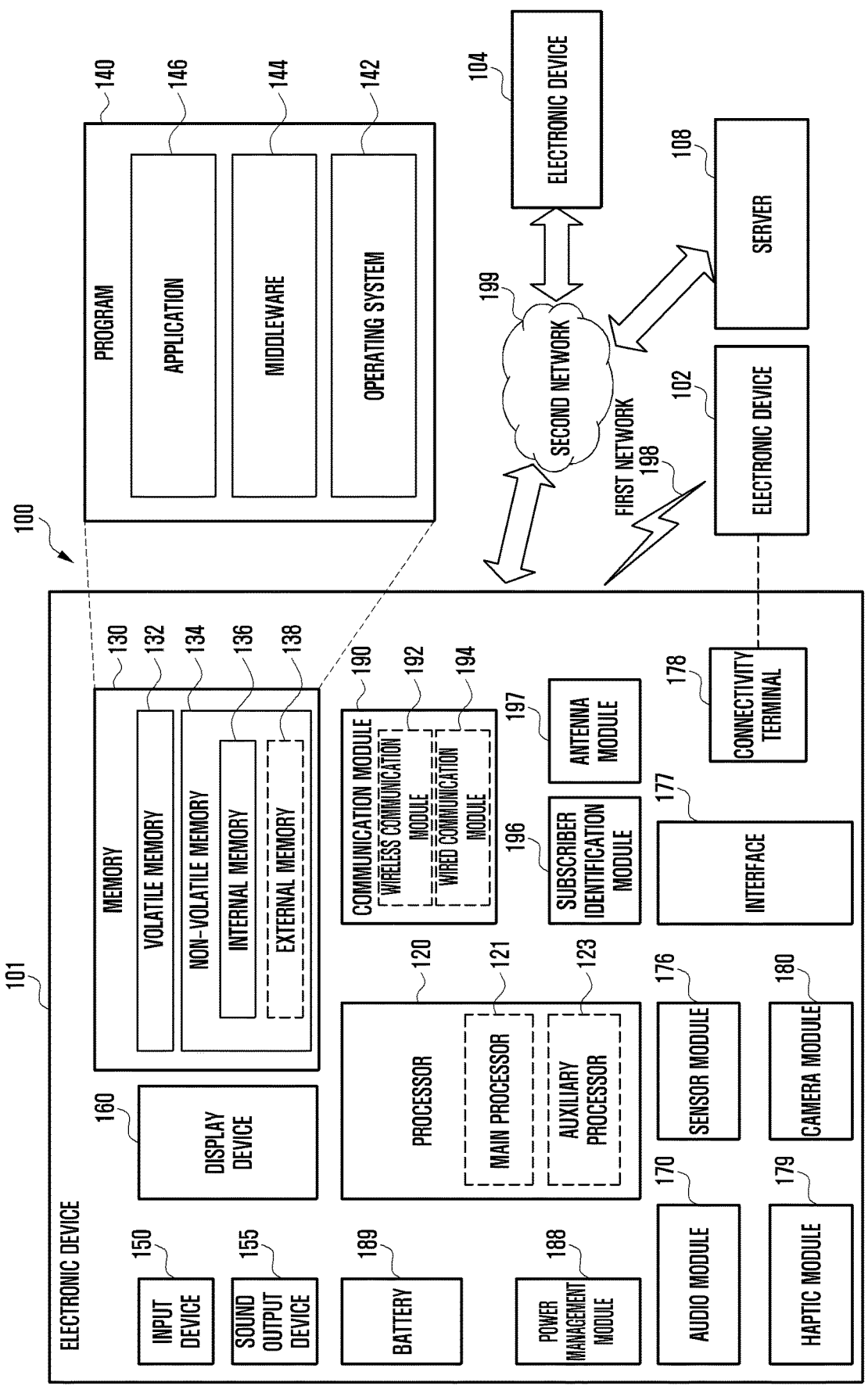
FIG. 1 is a block diagram illustrating an electronic device according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
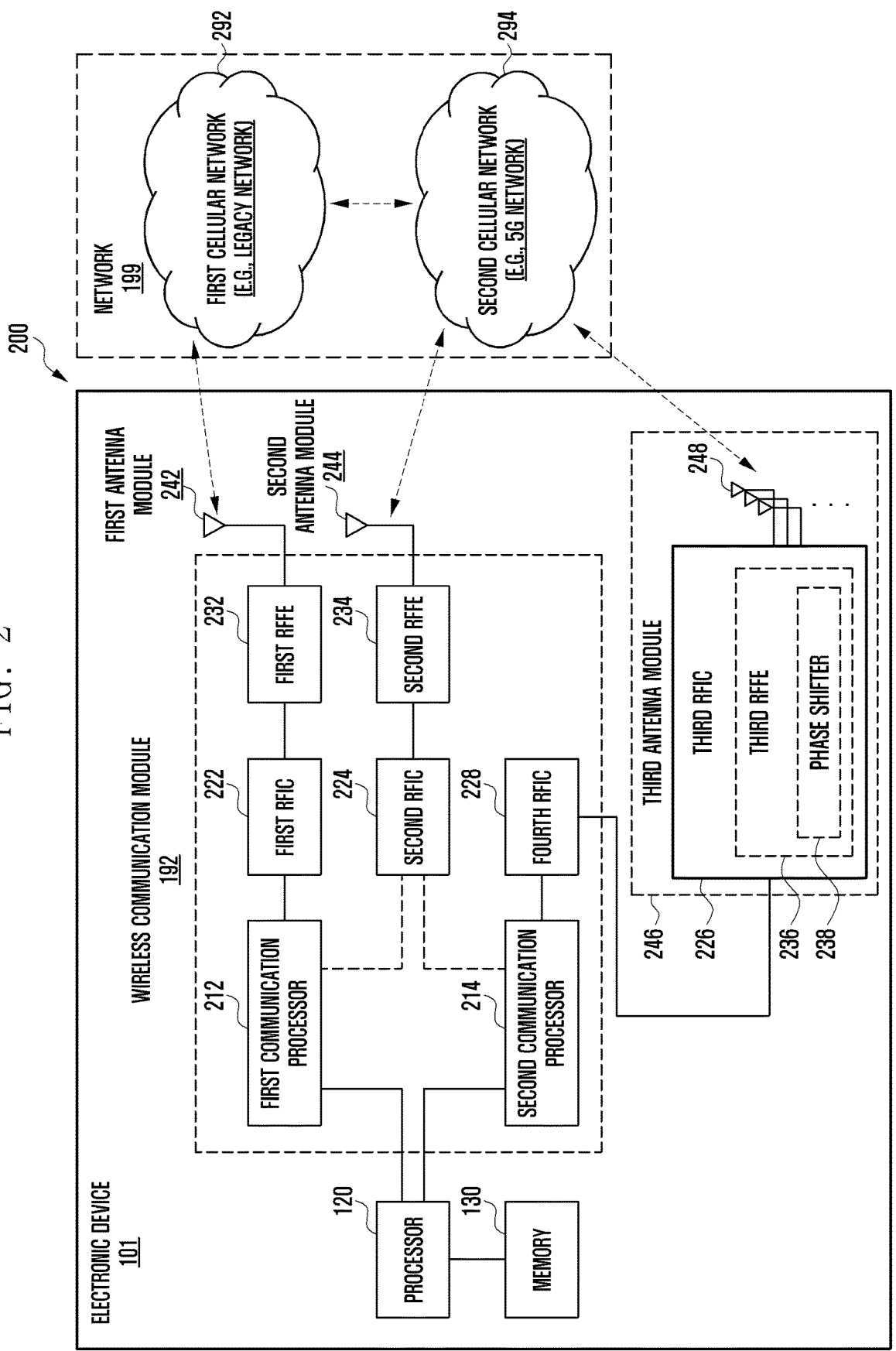
FIG. 2 is a block diagram illustrating an electronic device for supporting legacy network communication and 5G network communication according to an embodiment.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to an embodiment, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel. According to an embodiment, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to an embodiment, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above 6 RF signal) of a 5G Above 6 band (e.g., about 6 GHz to about 60 GHz) to be used in the second cellular network 294 (e.g., 5G network). Upon reception, a 5G Above 6 RF signal may be obtained from the second cellular network 294 (e.g., 5G network) through an antenna (e.g., the antenna 248) and be preprocessed through the third RFFE 236. The third RFIC 226 may convert the preprocessed 5G Above 6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above 6 RF signal to be transmitted to the outside (e.g., a base station of a 5G network) of the electronic device 101 through a corresponding antenna element. Upon reception, each of the plurality of phase shifters 238 may convert a phase of the 5G Above 6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
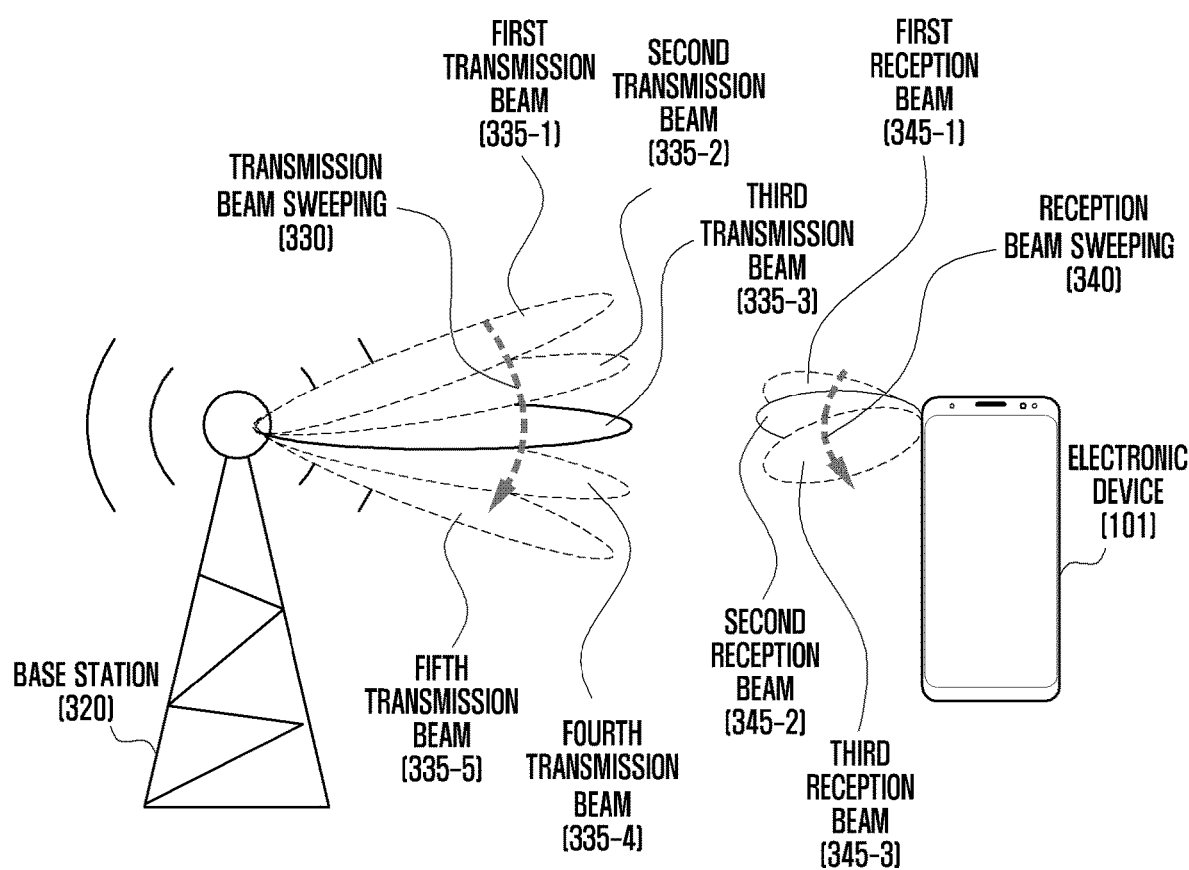
FIG. 3 is a diagram illustrating an embodiment of an operation for wireless communication connection between a base station and an electronic device in a second network (e.g., 5G network) of FIG. 2, using a directional beam for wireless connection.

FIG. 3 is a diagram illustrating example operation for wireless communication connection between a base station 320 and the electronic device 101 in the second network 294 (e.g., 5G network) illustrated in FIG. 2, which uses a directional beam for wireless connection.

The base station (gNodeB (gNB), transmission reception point (TRP)) 320 may perform a beam detection operation together with the electronic device 101 for the wireless communication connection. In the example embodiment illustrated in FIG. 3, for beam detection, the base station 320 may perform transmission beam sweeping 330 at least one time by sequentially transmitting a plurality of transmission beams, for example, first to fifth transmission beams 331-1, 331-2, 331-3, 331-4, 331-5 (which may be referred to hereinafter as transmission beams 331-1 to 331-5), which are oriented in different directions.

Each of the first to fifth transmission beams 331-1 to 331-5 may include, for example, at least one synchronization sequences (SS)/physical broadcast channel (PBCH) block (SS/PBCH block). The SS/PBCH block may be used to periodically measure the strength of a channel or a beam of the electronic device 101.

In another embodiment, each of the first to fifth transmission beams 331-1 to 331-5 may include at least one channel state information-reference signal (CSI-RS). A CSI-RS may refer, for example, to a reference signal that may flexibly be configured by the base station 320, and may be transmitted periodically/semi-persistently or aperiodically. The electronic device 101 may measure the intensities of a channel and a beam using the CSI-RS.

The transmission beams may have a radiation pattern having a selected beam width. For example, each of the transmission beams may have a broad radiation pattern having a first beam width, or a sharp radiation pattern having a second beam width smaller than the first beam width. For example, transmission beams including a SS/PBCH block may have a radiation pattern wider than that of transmission beams including a CSI-RS.

The electronic device 101 may perform reception beam sweeping 340 while the base station 320 is performing transmission beam sweeping 330. For example, while the base station 320 is performing first transmission beam sweeping 330, the electronic device 101 may fix a first reception beam 345-1 in a first direction to receive a signal of a SS/PBCH block transmitted by at least one of the first to fifth transmission beams 331-1 to 331-5. While the base station 320 is performing second transmission beam sweeping 330, the electronic device 101 may fix a second reception beam 345-2 in a second direction to receive a signal of a SS/PBCH block transmitted by the first to fifth transmission beams 331-1 to 331-5. While the base station 320 is performing third transmission beam sweeping 330, the electronic device 101 may fix a third reception beam 345-3 in a third direction to receive a signal of a SS/PBCH block transmitted by the first to fifth transmission beams 331-1 to 331-5. As described above, the electronic device 101 may select a communication-enabled reception beam (e.g., second reception beam 345-2) and a communication-enabled transmission beam (e.g., third transmission beam 331-3), based on a result of a signal receiving operation through reception beam sweeping 340.

Based on the communication-enabled transmission/reception beams being determined, the base station 320 and the electronic device 101 may transmit and/or receive pieces of basic information for cell configuration and configure information for additional beam management, based on the pieces of basic information. For example, the beam management information may include detailed information of a configured beam, and configuration information of a SS/PBCH block, CSI-RS, or additional reference signal.

In addition, the electronic device 101 may consistently monitor the intensities of a channel and a beam using at least one of a SS/PBCH block and a CSI-RS included in a transmission beam. The electronic device 101 may adaptively select a beam having good quality using the monitoring operation. If the electronic device 101 is moved or beams are blocked whereby communication is disconnected, the beam sweeping operation may be re-performed to determine a communication-enabled beam.

Figure 4:
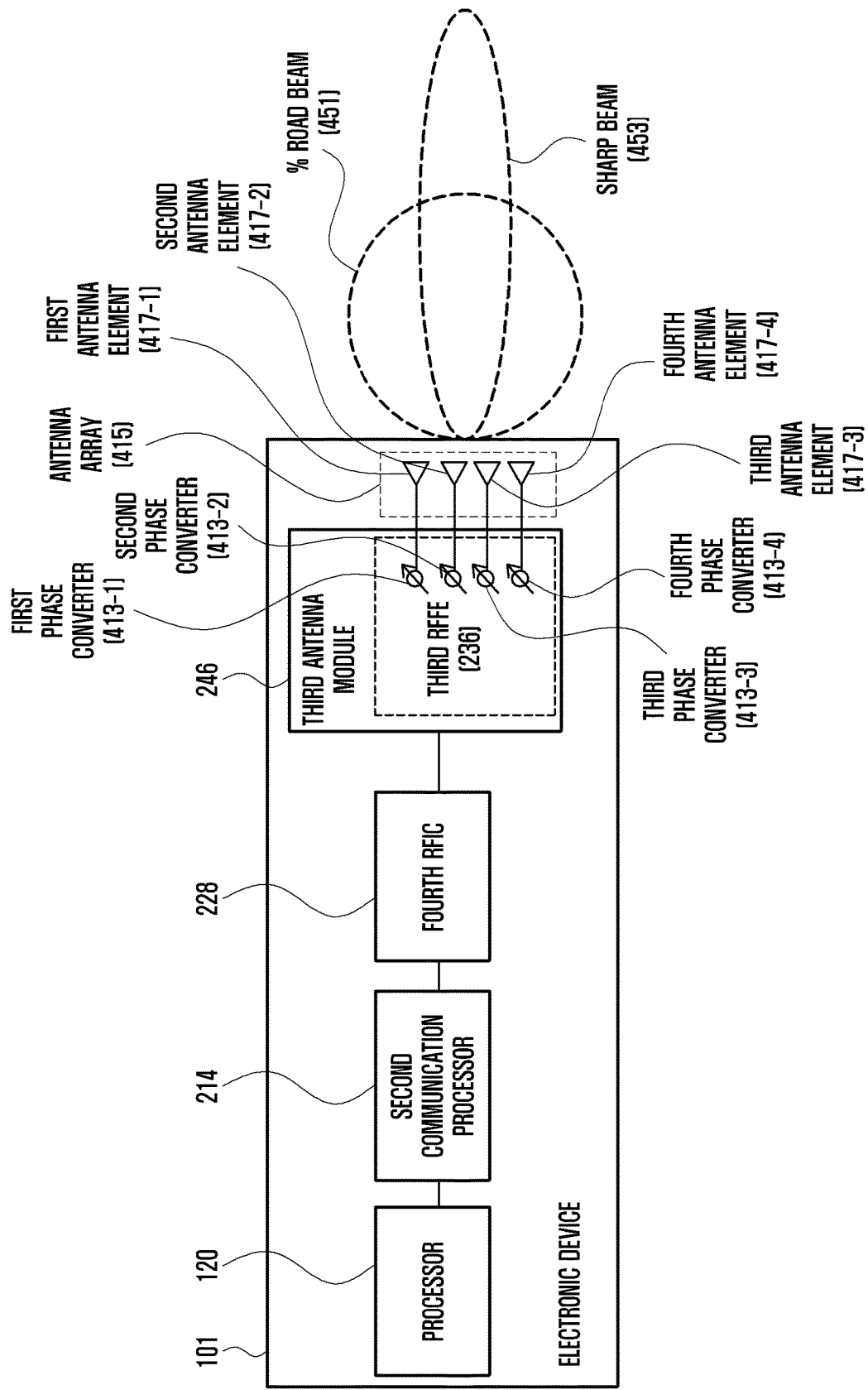
FIG. 4 is a block diagram illustrating an electronic device for 5G network communication according to an embodiment.

FIG. 4 is a block diagram illustrating an electronic device 101 for 5G network communication according to an embodiment.

The electronic device 101 may include various components illustrated in FIG. 2. However, FIG. 4 illustrates, for a brief description, the electronic device including a processor (e.g., including processing circuitry) 120, a second communication processor (e.g., including processing circuitry) 214, a fourth RFIC 228, and at least one third antenna module 246.

In an embodiment illustrated in FIG. 4, the third antenna module 246 may include first, second, third and fourth phase shifters 413-1, 413-2, 413-3, 413-4 (which may be referred to hereinafter as first to fourth phase shifters 413-1 to 413-4) (e.g., phase shifter 238 illustrated in FIG. 2) and/or first, second, third and fourth antenna elements 417-1, 417-2, 417-3, 417-4 (which may be referred to hereinafter as first to fourth antenna elements 417-1 to 417-4) (e.g., antenna 248 illustrated in FIG. 2). Each of the first to fourth antenna elements 417-1 to 417-4 may electrically be connected to each of the first to fourth phase shifters 413-1 to 413-4. The first to fourth antenna elements 417-1 to 417-4 may form at least one antenna array 415.

The second communication processor 214 may include various processing circuitry and control the first to fourth phase shifters 413-1 to 413-4 to control the phases of signals transmitted and/or received through the first to fourth antenna elements 417-1 to 417-4 and accordingly generate a transmission beam and/or a reception beam in a selected direction.

According to an embodiment, the third antenna module 246 may generate a broad radiation pattern beam 451 (hereinafter, "broad beam") or a sharp (e.g., relatively narrower than the broad beam) radiation pattern beam 452 (hereinafter, "sharp beam") as described above, according to the number of the used antenna elements. For example, the third antenna module 246 may generate a sharp beam 452 using all of the first to fourth antenna elements 417-1 to 417-4, and may generate a broad beam 451 using only the first antenna element 417-1 and the second antenna element 417-2. The broad beam 451 may have a wider coverage than the sharp beam 452 but has a smaller antenna gain than the sharp beam 452 and thus can be more effectively used for beam searching. On the other hand, the sharp beam 452 may have a narrower coverage than the broad beam 451 but a higher antenna gain than the broad beam 451 and thus can improve communication performance.

According to an embodiment, the second communication processor 214 may include various processing circuitry and may utilize a sensor module 176 (e.g., 9-axis sensor, grip sensor, or GPS) for beam searching. For example, the electronic device 101 may use the sensor module 176 to adjust a beam searching location and/or a beam searching cycle, based on a location and/or a movement of the electronic device 101. According to another example, if the electronic device 101 is held by a user, a grip sensor is used to identify the portion held by the user, whereby an antenna module having better communication performance among a plurality of third antenna modules 246 may be selected.

Figure 5:
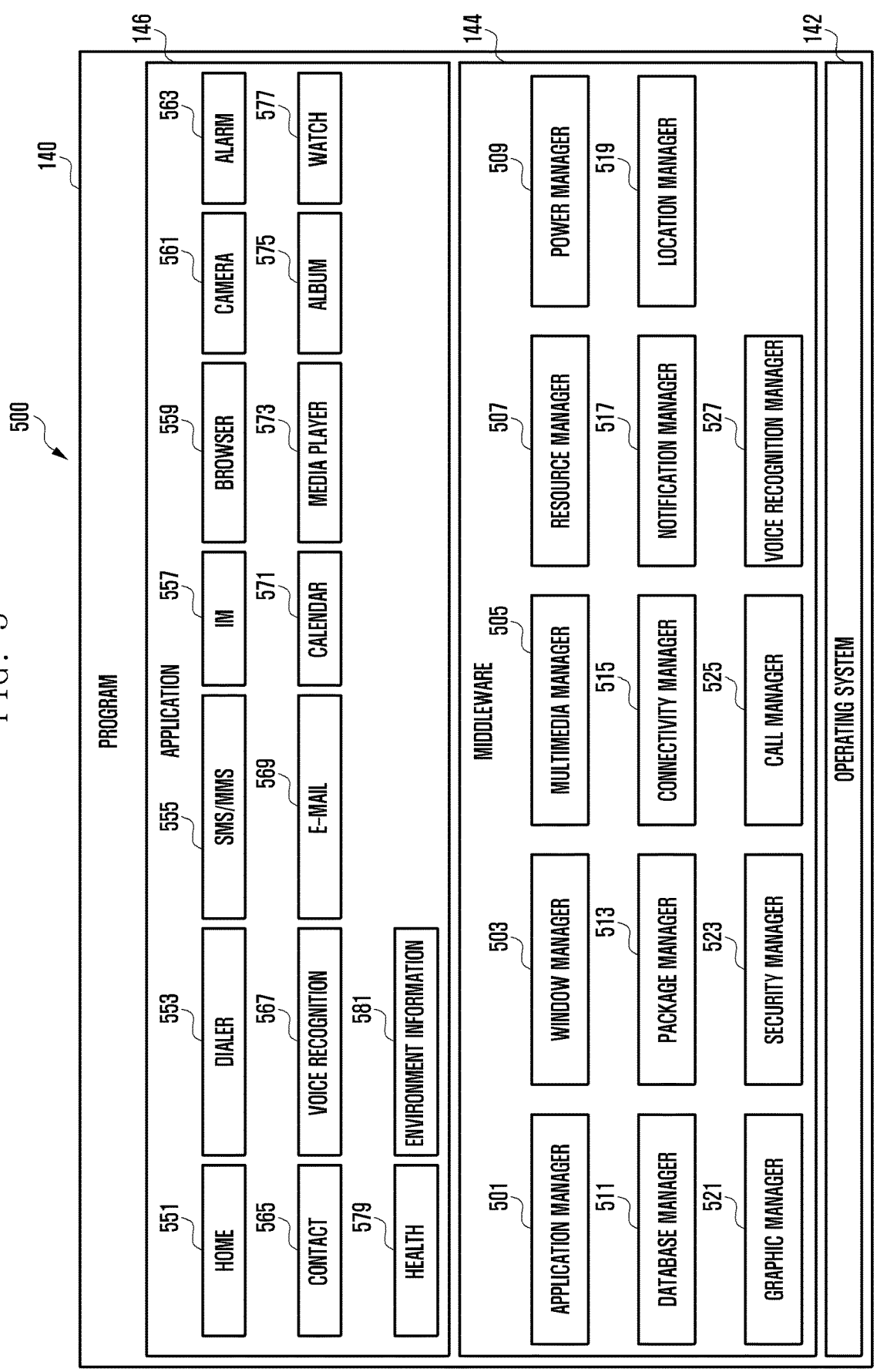
FIG. 5 is a block diagram illustrating a program according to an embodiment.

FIG. 5 is a block diagram 500 illustrating the program 140 according to an embodiment. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 501, a window manager 503, a multimedia manager 505, a resource manager 507, a power manager 509, a database manager 511, a package manager 513, a connectivity manager 515, a notification manager 517, a location manager 519, a graphic manager 521, a security manager 523, a telephony manager 525, or a voice recognition manager 527.

The application manager 501, for example, may manage the life cycle of the application 146. The window manager 503, for example, may manage one or more graphical user interface (GUI) resources that are used on a screen. The multimedia manager 505, for example, may identify one or more formats to be used to play media files, and may encode or decode a corresponding one of the media files using a codec appropriate for a corresponding format selected from the one or more formats. The resource manager 507, for example, may manage the source code of the application 146 or a memory space of the memory 130. The power manager 509, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 509 may interwork with a basic input/output system (BIOS) (not shown) of the electronic device 101.

The database manager 511, for example, may generate, search, or change a database to be used by the application 146. The package manager 513, for example, may manage installation or update of an application that is distributed in the form of a package file. The connectivity manager 515, for example, may manage a wireless connection or a direct connection between the electronic device 101 and the external electronic device. The notification manager 517, for example, may provide a function to notify a user of an occurrence of a specified event (e.g., an incoming call, message, or alert). The location manager 519, for example, may manage locational information on the electronic device 101. The graphic manager 521, for example, may manage one or more graphic effects to be offered to a user or a user interface related to the one or more graphic effects.

The security manager 523, for example, may provide system security or user authentication. The telephony manager 525, for example, may manage a voice call function or a video call function provided by the electronic device 101.

The voice recognition manager 527, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 544 may dynamically delete some existing components or add new components. According to an embodiment, at least part of the middleware 144 may be included as part of the OS 142 or may be implemented as another software separate from the OS 142.

The application 146 may include, for example, a home 551, dialer 553, short message service (SMS)/multimedia messaging service (MMS) 555, instant message (IM) 557, browser 559, camera 561, alarm 563, contact 565, voice recognition 567, email 569, calendar 571, media player 573, album 575, watch 577, health 579 (e.g., for measuring the degree of workout or biometric information, such as blood sugar), or environmental information 581 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 569) of the electronic device 101 to the external electronic device. Additionally or alternatively, the notification relay application may receive notification information from the external electronic device and provide the notification information to a user of the electronic device 101.

Figure 6:
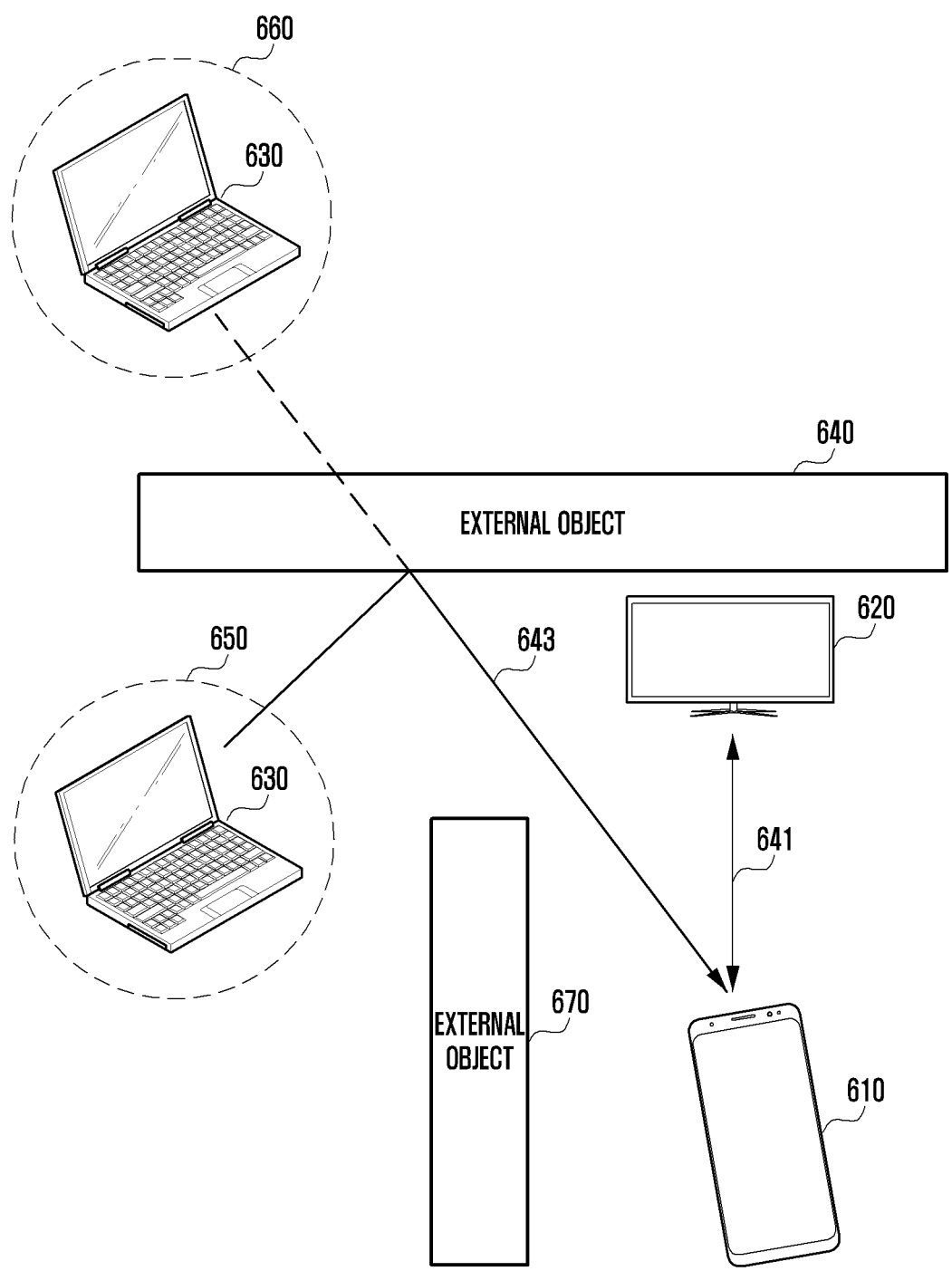
FIG. 6 is a diagram illustrating an electronic device, a first external electronic device, and a second external electronic device according to an embodiment.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device. FIG. 6 is a diagram illustrating an electronic device, a first external electronic device, and a second external electronic device according to an embodiment.

An electronic device 610 according to an embodiment (e.g., the electronic device 101 of FIG. 1) may transmit or receive data to or from an external electronic device located in a predetermined range with respect to the electronic device 610. The electronic device 610 may identify whether the external electronic device is present in the predetermined range using an angle of arrival (AoA) of a signal transmitted by the external electronic device. The electronic device 610 may transmit or receive data to or from the external electronic device when the AoA of a signal transmitted by the external electronic device is within a specific range.

According to an embodiment, the electronic device 610 may identify a movement distance of a signal based on the reception direction of the signal or a difference between the transmission time and reception time of the signal while transmitting/receiving the signal to/from the external electronic device. The electronic device 610 may identify relative position information between the external electronic device and the electronic device 610 based on the reception direction of the signal and the movement distance of the signal. The electronic device 610 may perform various operations (e.g., control the external electronic device or generate an indoor map including position information of the external electronic device) based on the identified relative position information.

According to an embodiment, the electronic device 610 may transmit or receive data to or from the first external electronic device 620 (e.g., the electronic device 104 of FIG. 1) through various communication means (e.g., short-range wireless communication including Bluetooth or Wi-Fi) in response to identifying that the AoA of the signal transmitted by the first external electronic device 620 is within a specific angle. The electronic device 610 may transmit or receive data to or from the second external electronic device 630 through various communication means (e.g., short-range wireless communication including Bluetooth or Wi-Fi) in response to identifying that the AoA of the signal transmitted by the second external electronic device 630 (e.g., the electronic device 104 of FIG. 1) is within a specific angle.

It may be difficult for the electronic device 610 to identify whether the signal transmitted by the first external electronic device 620 or the second external electronic device 630 is a straight wave or a reflected wave. In the example shown in FIG. 6, there is no external object in the data transmission path between the electronic device 610 and the first external electronic device 620, and therefore the signal transmitted from the first external electronic device 620 to the electronic device 610 may be a straight wave 641. The transmission path of the signal between the first external electronic device 620 and the electronic device 610 may be referred to as a line of sight (LoS) path through which the first external electronic device 620 and the electronic device 610 can be connected by a virtual straight line.

According to an embodiment, an external object 670 may exist between the electronic device 610 and the second external electronic device 630 so that there may be no LoS path through which the electronic device 610 and the second external electronic device 630 can be connected by a virtual straight line.

On the other hand, when the external object 670 exists in the data transmission path between the electronic device 610 and the second external electronic device 630, the signal transmitted from the second external electronic device 630 to the electronic device 610 may be a reflected wave 643 reflected by an external object 640.

According to an embodiment, when the electronic device 610 performs position measurement of the second external electronic device 630 using the reflected wave 643, an error may occur, and the accuracy of the position measurement of the second external electronic device 630 may be lower than that of the position measurement of the first external electronic device 620 using the straight wave 641. For example, referring to FIG. 6, the electronic device 610 may perform position measurement of the second external electronic device 630 based on the movement distance of the reflected wave 643 and the reception direction thereof. The electronic device 610 may determine that the second external electronic device 630 exists at a position 660 different from an actual position 650 of the second external electronic device 630 based on the movement distance and reception direction of the reflected wave 643. Hereinafter, embodiments in which the electronic device 610 improves the accuracy of the position measurement of the first external electronic device 620 or the second external electronic device 630 by distinguishing the reflected wave 643 from the straight wave 641 will be described.

Figure 7:
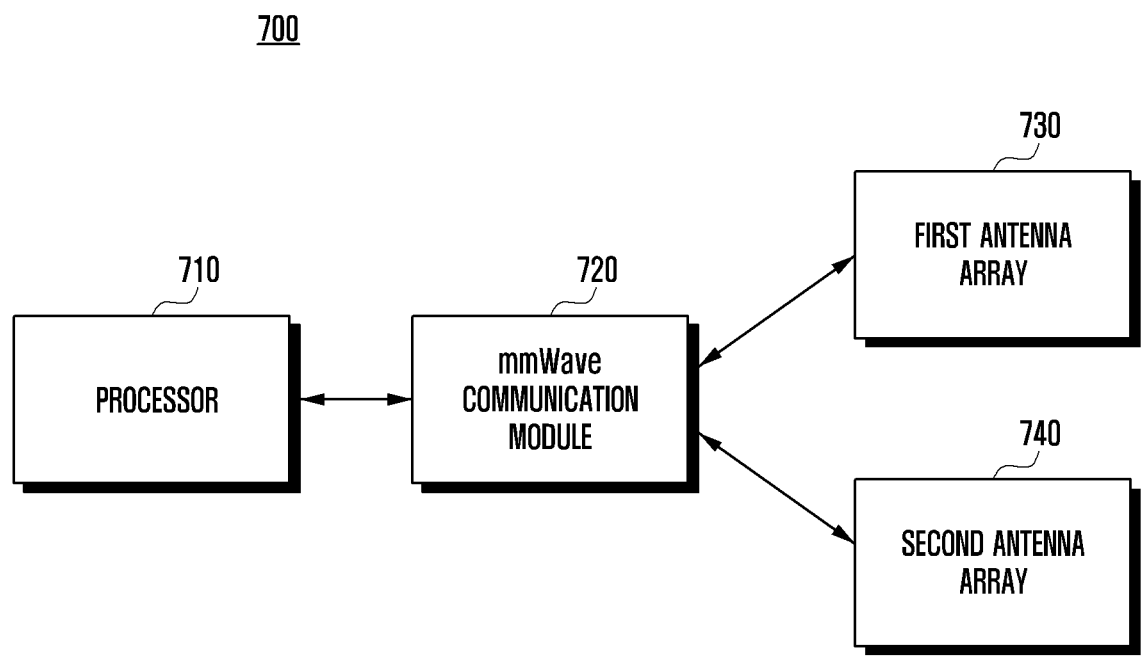
FIG. 7 is a block diagram illustrating an electronic device according to an embodiment.

FIG. 7 is a block diagram illustrating an electronic device according to an embodiment.

Referring to FIG. 7, an electronic device 700 (e.g., the electronic device 610 of FIG. 6) according to an embodiment may include a processor 710 (e.g., the processor 120 of FIG. 1), an mmWave communication module 720 (e.g., the second communication processor 214 of FIG. 2), a first antenna array 730 (e.g., the antenna array 415 of FIG. 4), and a second antenna array 740 (e.g. the antenna array 415 of FIG. 4). The processor 710 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the mmWave communication module 720 may use the first antenna array 730 and the second antenna array 740 to perform first communication with a first external electronic device (e.g., the first external electronic device 620 of FIG. 6) or a second external electronic device (e.g., the second external electronic device 630). The first communication may be in a communication scheme that uses signals having millimeter (mm) wavelengths. The communication scheme of the first communication may support full-duplex communication in which at least some of a plurality of antennas included in the first antenna array 730 or the second antenna array 740 are used for transmission of signals and the others thereof are used for reception of signals. For example, the communication scheme of the first communication may be Wi-Fi in the 60 GHz band as defined in IEEE 802.11ad or IEEE 802.11 ay, D2D communication defined in the 5th generation cellular communication scheme having a frequency band of 30 GHz to 300 GHz, or ultra wide band (UWB) communication. The mmWave communication module 720 may be operatively connected to the first antenna array 730 and/or the second antenna array 740 to transmit or receive signals in the frequency band supported by the communication scheme of the first communication. The mmWave communication module 720, the first antenna array 730, and the second antenna array 740 may be implemented in a packaged form to prevent large signal loss in the mmWave band. The electronic device 700 may include a plurality of mmWave modules 720 due to the small coverage of signals in the mmWave band.

According to an embodiment, the first antenna array 730 (e.g., the antenna array 415 of FIG. 4) may include a plurality of antennas (e.g., the first antenna element 417-1, the second antenna element 417-2, the third antenna element 417-3, and/or the fourth antenna element 417-4 of FIG. 4). The first antenna array 730 may perform beamforming so as to, for example, output a signal in a specific direction based on the control of the mmWave communication module 720.

According to an embodiment, the second antenna array 740 (e.g., the antenna array 415 of FIG. 4) may include a plurality of antennas (e.g., the first antenna element 417-1, the second antenna element 417-2, the third antenna element 417-3, and/or the fourth antenna element 417-4 of FIG. 4). The second antenna array 740 may receive a signal transmitted by the first external electronic device 620 or the second external electronic device 630 using the plurality of antennas, and may transmit the received signal to the mmWave communication module 720.

According to an embodiment, the processor 710 may be operatively connected to the mmWave communication module 720 to control the mmWave communication module 720.

According to an embodiment, the processor 710 may receive a first signal transmitted by an external electronic device (e.g., the first external electronic device 620 or the second external electronic device 630) using the second antenna array 740, and may identify the distance of a transmission path of the first signal based on the characteristics of the first signal. The transmission path of the first signal may be a transmission path of the signal between the electronic device 700 and the external electronic device, and may be referred to a straight path (e.g., 641 of FIG. 6) between the external electronic device and the electronic device 700 when the signal transmitted by the external electronic device is a wave propagated in a straight line and is not reflected by an external object (e.g., the external object 640 of FIG. 6). When the signal transmitted by the external electronic device is a wave that is reflected by the external object 640, the transmission path of the first signal may refer to a reflected path (e.g., 643 in FIG. 6) of a reflected signal, which is different from the straight path, between the external electronic device and the electronic device 700.

According to an embodiment, the first signal may include information regarding the time at which the first signal is transmitted by the external electronic device. The processor 710 may identify information regarding the time at which the first signal is received and the time at which the first signal is transmitted, and may identify the distance of the transmission path of the first signal based on the difference between the time at which the first signal is received and the time at which the first signal is transmitted. The distance of the transmission path of the first signal may be obtained by multiplying the transmission speed of the first signal (e.g., the speed of light or $3*10^8$ m/s) by the difference between the time at which the first signal is received and the time at which the first signal is transmitted.

According to an embodiment, when the communication scheme of the first communication is Wi-Fi defined in IEEE 802.11ad or 802.11ay, the processor 710 may determine the movement distance of the first signal by using the external electronic device and a fine timing measurement (FTM) scheme defined in IEEE 802.11ad or 802.11ay. Details of determining the movement distance of the first signal by using FTM will be described later with reference to FIGS. 9A to 9B.

According to an embodiment, the processor 710 may control the mmWave communication module 720 so that the first antenna array 730 outputs a second signal to identify whether the first signal is a straight wave or a reflected wave. The processor 710 may control the mmWave communication module 720 to identify the direction in which the first signal is received and to output the second signal in the same direction as the direction in which the first signal is received.

According to an embodiment, the processor 710 may identify whether the second antenna array 740 receives a third signal. When the second antenna array 740 receives the third signal, the processor 710 may identify whether the third signal received by the second antenna array 740 is the second signal reflected and received by the external object 640. For example, the processor 710 may identify whether the third signal is the same signal as the second signal based on information included in the third signal, such as information indicating the device that transmitted the third signal or information indicating the time at which the third signal is transmitted. The specific embodiment of identifying the transmission time of the second signal and the reception time of the third signal will be described later with reference to FIGS. 10A to 10B.

According to an embodiment, in response to receiving the third signal, the processor 710 may control the mmWave communication module 720 to identify the distance of a transmission path of the second signal based on the difference between the transmission time of the second signal and the reception time of the third signal. The distance of the transmission path of the second signal may be half of the value obtained by multiplying the transmission speed of the second signal (e.g., $3*10^8$ m/s) by the difference between the time at which the third signal is received and the time at which the second signal is transmitted.

The specific operation of identifying the distance of the transmission path of the first signal described above and the specific operation of identifying the distance of the transmission path of the second signal may be implemented without determining the order thereof, and may be implemented independently.

According to an embodiment, the processor 710 may identify whether the transmission path of the first signal is an LoS path between the electronic device 700 and the external electronic device, that is, whether the first signal is a wave in a straight line, based on the difference between the transmission path of the first signal and the transmission path of the second signal.

According to an embodiment, in response to identifying that the difference between the transmission path of the first signal and the transmission path of the second signal is equal to or smaller than (or simply smaller than) a designated value, the processor 710 may determine that the transmission path of the first signal is an LoS path between the electronic device 700 and the external electronic device. The fact that the transmission path of the first signal corresponds to an LoS path may mean that the first signal transmitted by the external electronic device has reached the electronic device 700 without being reflected by the external object 640.

According to an embodiment, in response to identifying that the difference between the transmission path of the first signal and the transmission path of the second signal exceeds (or is equal to or larger than) the designated value, the processor 710 may determine that the transmission path of the first signal is not an LoS path between the electronic device 700 and the external electronic device. The fact that the transmission path of the first signal is not an LoS path may mean that the first signal transmitted by the external electronic device is first reflected by the external object 640 and then reached the electronic device 700.

According to an embodiment, the designated value may be a value related to the accuracy of the position measurement of the external electronic device. The designated value may be determined based on the resolution of the position measurement. Considering that the resolution of position measurement using mmWave signals is on the order of magnitude of several centimeters (cm), the designated value may be set to 20 centimeters. As the accuracy of the position measurement of the external electronic device increases, the designated value may decrease. The designated value may be determined based on the state of the first communication. The state of the first communication may include characteristics related to the quality of the first communication (e.g., quality of service (QoS) or received signal strength indicator (RSSI)). The processor 710 may change the designated value according to a change in the state of the first communication. When the quality of the first communication increases, the processor 710 may decrease the designated value. As another example, when the quality of the first communication decreases, the processor 710 may increase the designated value. Thus, the accuracy of the position measurement of the external electronic device that may be changed by changing the designated value to reflect changes in the state of the first communication.

According to an embodiment, the processor 710 may perform the above-described operations based on identifying that the AoA of the signal transmitted by the external electronic device satisfies a specific condition. The processor 710 may perform an operation of identifying the distance of the transmission path of the first signal and the distance of the transmission path of the second signal based on whether the AoA of the signal transmitted by the external electronic device is within a specific range. The above embodiment will be described in more detail below in connection with FIG. 8.

Figure 8:
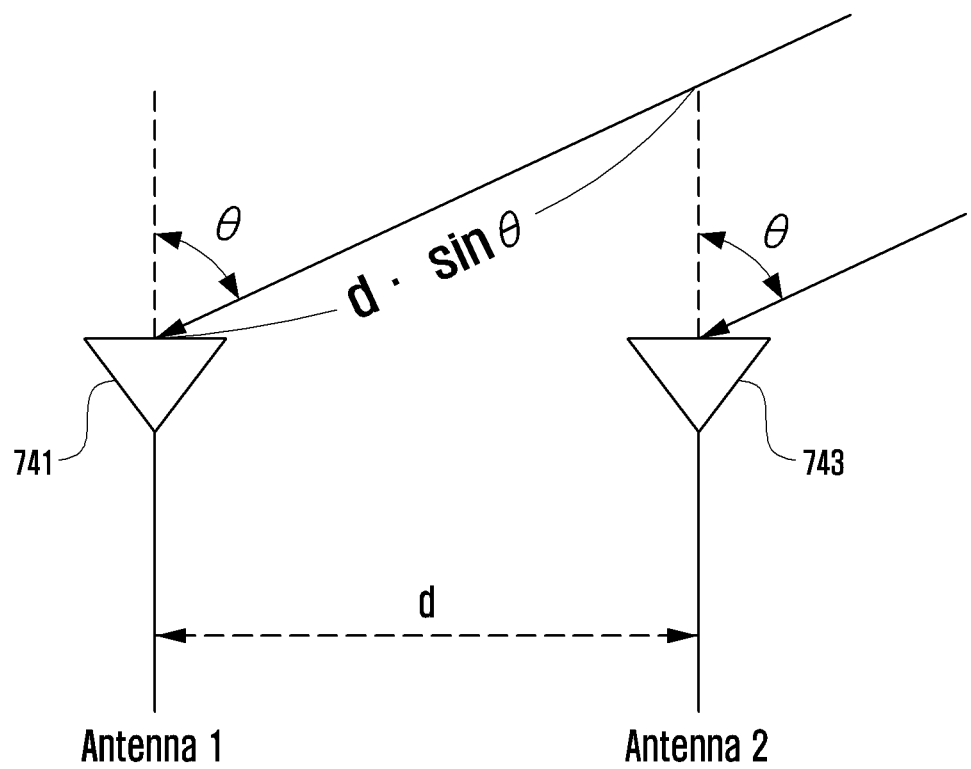
FIG. 8 is a diagram illustrating an embodiment of determining an angle of arrival (AoA) of a signal transmitted by an external electronic device in an electronic device according to an embodiment.

FIG. 8 is a diagram illustrating an embodiment of determining an angle of arrival (AoA) of a signal transmitted by an external electronic device in an electronic device according to an embodiment.

Referring to FIG. 8, the first antenna 741 and the second antenna 743 included in the second antenna array illustrated in FIG. 7 (e.g., the second antenna array 740 of FIG. 7) are illustrated.

According to an embodiment, a processor (e.g., the processor 710 of FIG. 7) may identify an AoA of a signal transmitted by an external electronic device (e.g., the first external electronic device 620 or the second external electronic device 630 of FIG. 6) based on the phase difference between signals received by the first antenna 741 and the second antenna 743.

According to an embodiment, the first antenna 741 and the second antenna 743 may receive the signal transmitted by the external electronic device (e.g., the first external electronic device 620 or the second external electronic device 630 of FIG. 6). The phases of the signals received by the first antenna 741 and the second antenna 743 may be different from each other. Referring to FIG. 8, the signal received by the first antenna 741 may proceed by d*sin(0) more than the signal received by the second antenna 743.

According to an embodiment, the difference between the phase of the signal received by the first antenna 741 and the phase of the signal received by the second antenna 743 may be calculated using Equation 1 below.

$$pd(\theta) = \angle(r_2^*(\theta)r_1(\theta)) = -2\pi \cdot f_0 \cdot \frac{d}{c}\sin\theta \quad \text{[Equation 1]}$$

Where $pd(\theta)$: phase difference, $r_1(\theta)$: phase of the signal received by the first antenna, $r_2(\theta)$: phase of the signal received by the second antenna, $f_0$: frequency of signal, d: distance between first antenna and second antenna, c: speed of signal, and $\theta$: AoA.

According to an embodiment, the processor 710 may identify the phase difference between the signals received by the first antenna 741 and the second antenna 743 and may identify the AoA based on the phase difference.

According to an embodiment, instead of using the phase difference, the processor 710 may determine the AoA by transmitting signals corresponding to the signal from the external electronic device in various directions. The transmitted signal may include a request signal for transmitting the signal. The external electronic device may transmit signal in response to receiving the signal transmitted from the electronic device 100. The processor 710 may receive the signal output by the external electronic device. The movement distance of the signal corresponding to the AoA may be the shortest among the signals transmitted from the external electronic device and the strength of the signal corresponding to AoA may be the greatest among the signals transmitted from the external electronic device. The processor 710 may identify the strength of the received signal and may determine a direction corresponding to the signal having the greatest strength among the strengths of the identified signals as the AoA.

According to an embodiment, the processor 710 may perform the operation of identifying the distance of the transmission path of the first signal and the distance of the transmission path of the second signal based on whether the AoA of the signal transmitted by the external electronic device is included in a specific range.

Figure 9A:
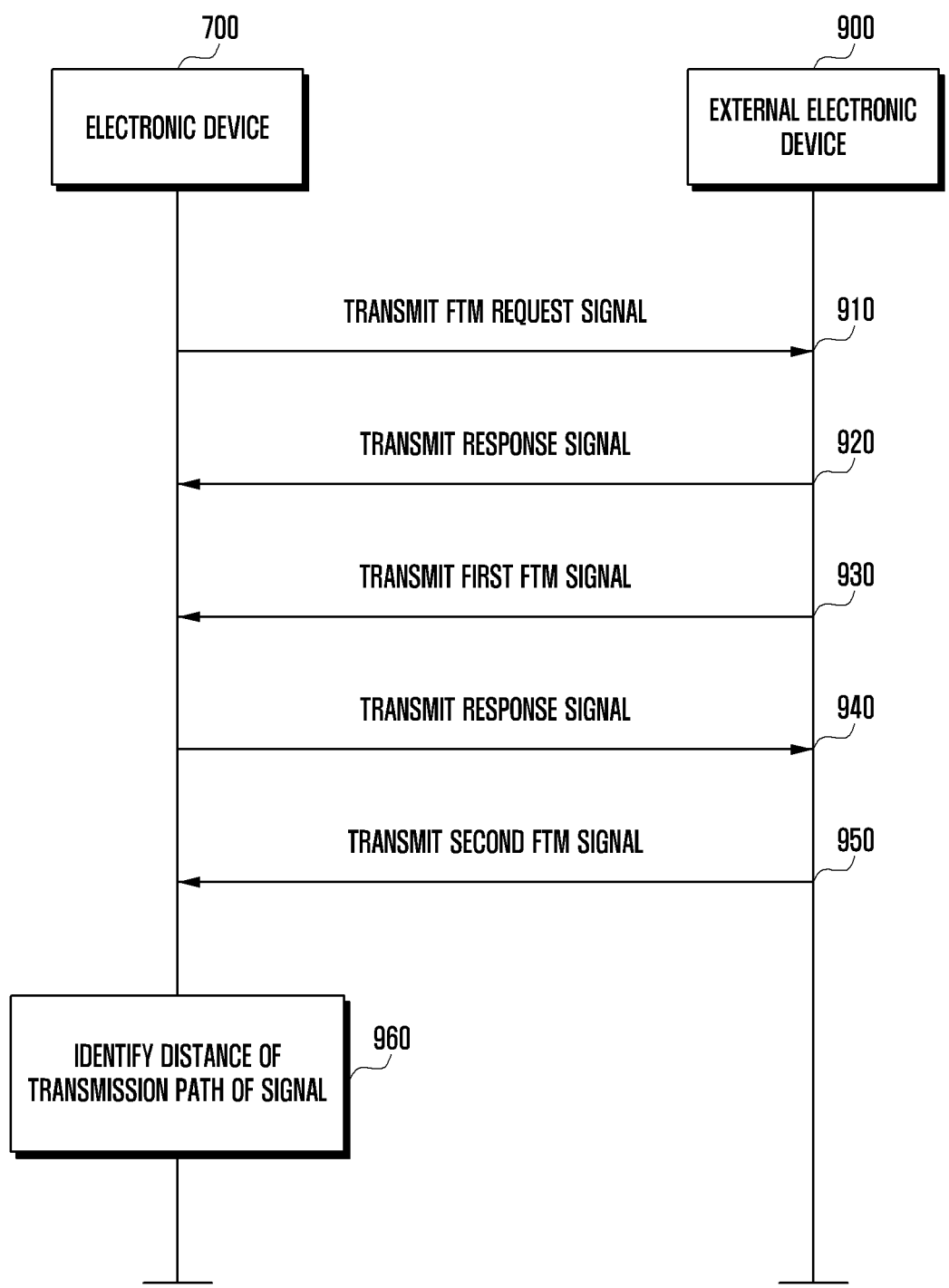
FIG. 9A is a diagram illustrating an embodiment of determining a movement distance of a signal using fine timing measurement (FTM) in an electronic device according to an embodiment.
Figure 9B:
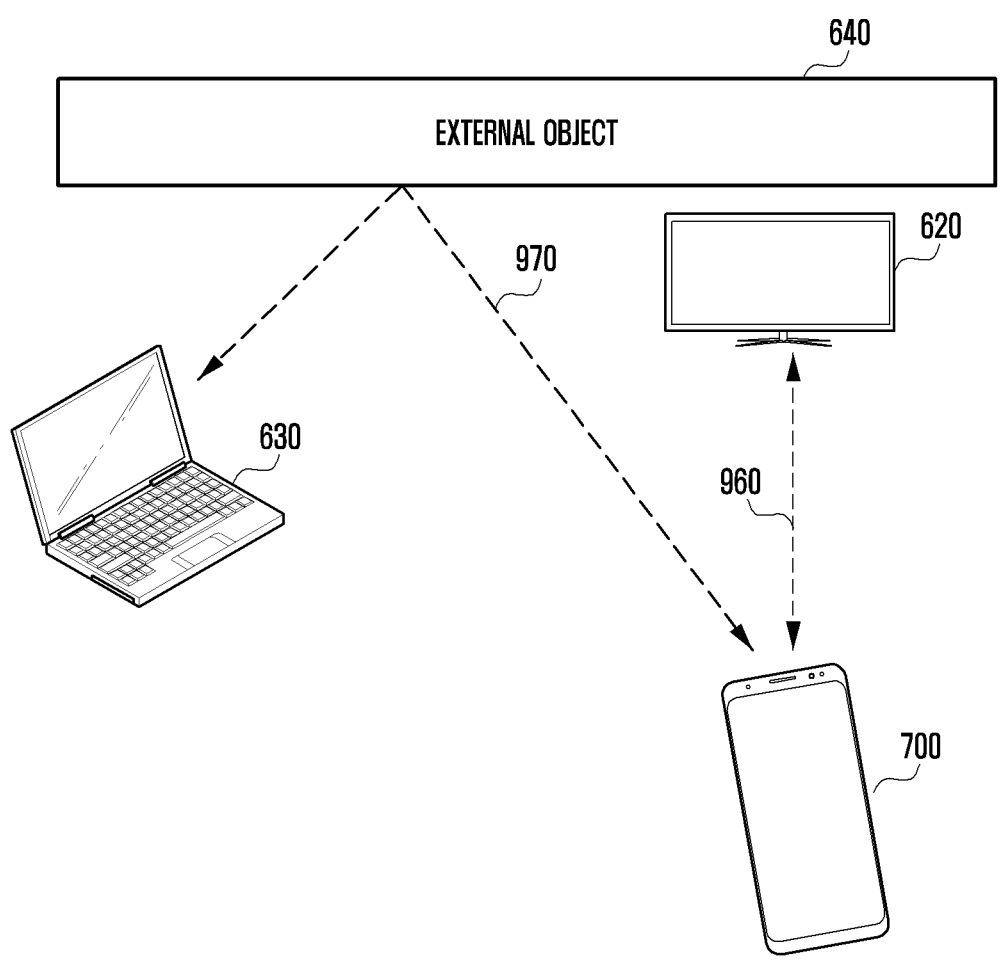
FIG. 9B is a diagram illustrating an embodiment of determining a movement distance of a signal using FTM in an electronic device according to an embodiment.

FIG. 9A is a diagram illustrating an embodiment of determining a movement distance of a signal using fine timing measurement (FTM) in an electronic device according to an embodiment, and FIG. 9B is a diagram illustrating an embodiment of determining a movement distance of a signal using FTM in an electronic device according to an embodiment.

FIG. 9A illustrates operations for measuring the movement distance of a first signal between an electronic device (e.g., the electronic device 700 of FIG. 7) and an external electronic device 900 (e.g., the first external electronic device 620 or the second external electronic device 630 of FIG. 6).

According to an embodiment, in operation 910, the electronic device 700 may transmit an FTM request signal to the external electronic device 900.

According to an embodiment, in operation 920, the external electronic device 900 may transmit a response signal in response to receiving the FTM request signal transmitted by the electronic device 700.

According to an embodiment, in operation 930, a first FTM signal for measuring the movement distance of the first signal transmitted between the electronic device 700 and the external electronic device 900 may be transmitted. The first FTM signal may refer to the first signal, and may refer to the first signal in the method of measuring the transmission path of the signal using the FTM scheme.

According to an embodiment, the external electronic device 900 may transmit the first FTM signal including a transmission time t1 of the first FTM signal.

According to an embodiment, in operation 940, the electronic device 700 may transmit a response signal in response to receiving the first FTM signal.

According to an embodiment, the electronic device 700 may identify a time t2 at which the first FTM signal is received and a time t3 at which the response signal is transmitted while transmitting the response signal.

According to an embodiment, in operation 950, the external electronic device 900 may transmit a second FTM signal in response to receiving the response signal transmitted by the electronic device 700. The second FTM signal may refer to the second signal and may refer to the second signal in the method of measuring the transmission path of the signal using the FTM scheme.

According to an embodiment, the external electronic device 900 may transmit a second FTM signal including a time t4 at which the response signal transmitted by the electronic device in operation 940 is received.

According to an embodiment, in operation 960, the electronic device 700 may identify the distance of the transmission path of the first signal based on t1 to t4.

According to an embodiment, the electronic device 700 (or the processor 710) may determine, as the distance of the transmission path of the first signal, the value obtained by multiplying the speed of the first FTM signal by half of the difference value between a first difference value between the time t4 and the time t1, and a second difference value between the time t3 and the time t2.

According to another embodiment, the electronic device 700 (or the processor 710) may determine, as the distance of the transmission path of the first signal, the value obtained by multiplying the speed of the first FTM signal by an average of a first difference value between the time t2 and the time t1 and a second difference value between the time t4 and the time t3.

FIG. 9B is a diagram illustrating an embodiment in which the electronic device 700 according to an embodiment determines the distance of a transmission path of a first signal by using the method shown in FIG. 9A.

Referring to FIG. 9B, the electronic device 700 may receive a first signal transmitted by a first external electronic device (e.g., the first external electronic device 620 of FIG. 6). The first signal may include time information at which the first external electronic device 620 receives a signal for requesting the first signal. The electronic device 700 (or the processor 710) may determine the distance of the transmission path of the first signal based on the difference between a time at which the first external electronic device 620 receives the signal for requesting the first signal and a time at which the electronic device 700 receives the first signal.

According to an embodiment, the transmission path of the first signal transmitted by the first external electronic device 620, whose distance is determined by the electronic device 700, may be a straight path that is not reflected by the external object 640, as shown in FIG. 9B.

According to an embodiment, the electronic device 700 may receive a first signal transmitted by a second external electronic device (e.g., the second external electronic device 630 of FIG. 6). The first signal may include time information at which the second external electronic device 630 receives a signal for requesting the first signal. The electronic device 700 (or the processor 710) may determine the distance 970 of the transmission path of the first signal based on a difference between a time at which the second external electronic device 630 receives the signal for requesting the first signal and a time at which the electronic device 700 receives the first signal.

According to an embodiment, the transmission path of the first signal transmitted by the second external electronic device 630, whose distance is determined by the electronic device 700, may be a reflected path that is reflected by the external object 640, as shown in FIG. 9B.

Figure 10A:
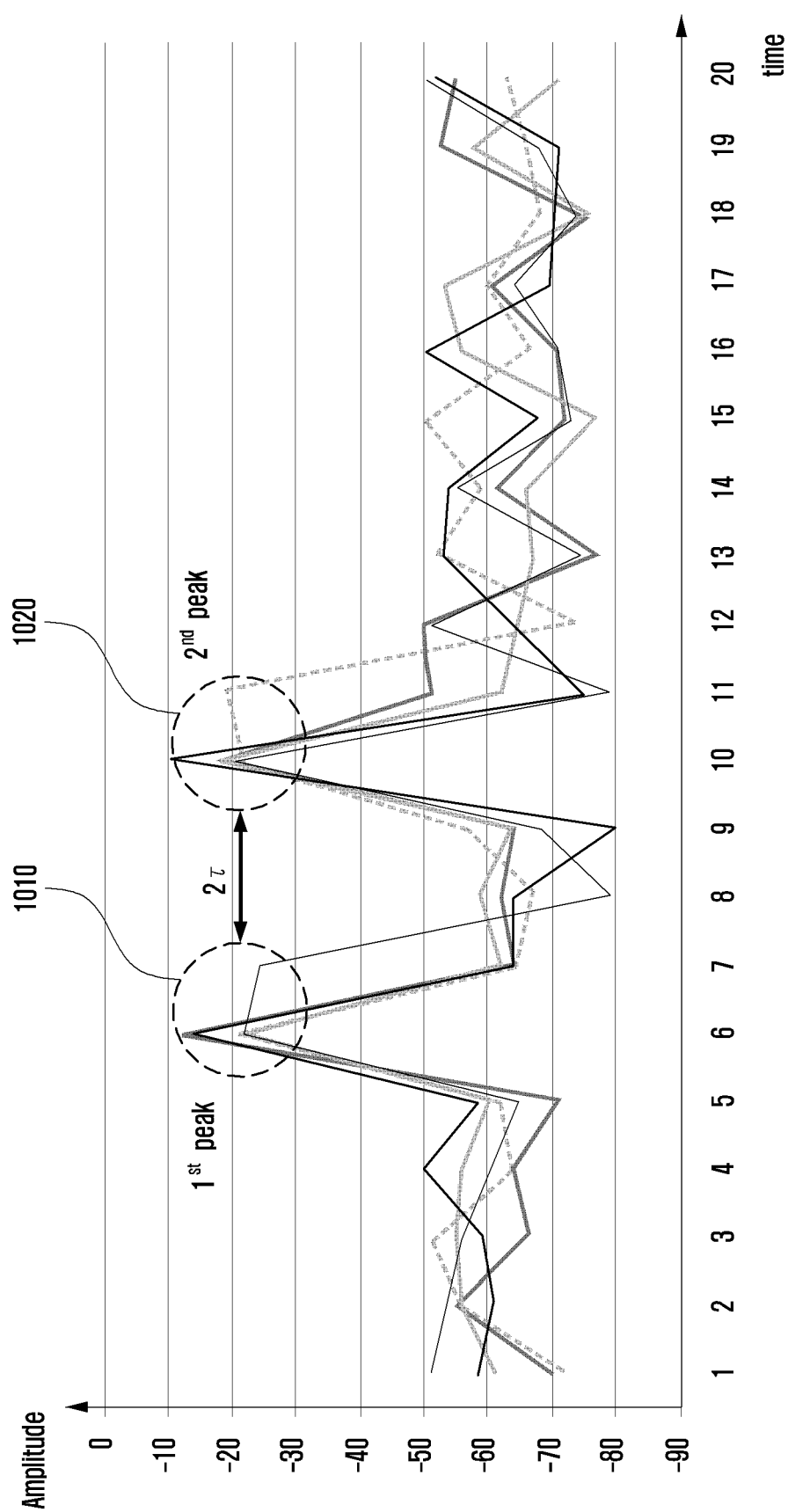
FIG. 10A is a graph illustrating an embodiment of determining a movement distance of a signal using a reflected signal in an electronic device according to an embodiment.
Figure 10B:
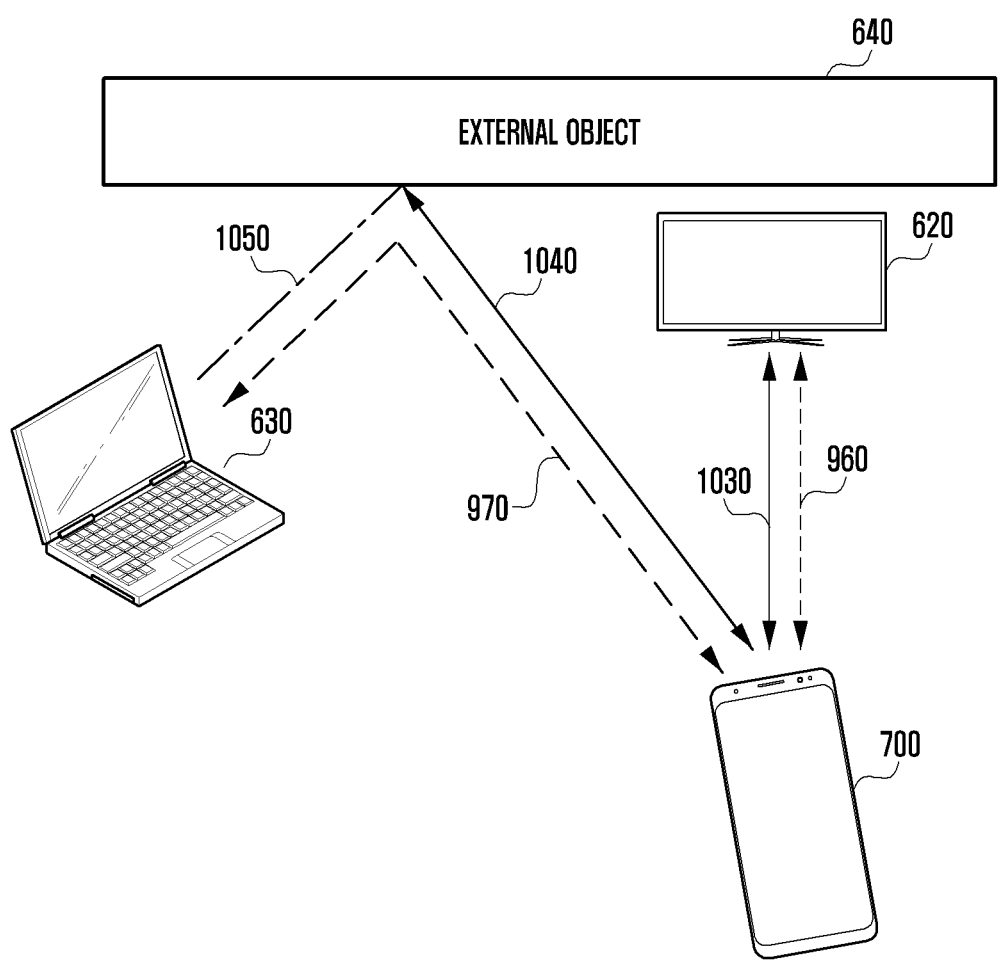
FIG. 10B is a diagram illustrating an embodiment of determining a movement distance of a signal using a reflected signal in an electronic device according to an embodiment.

FIG. 10A is a graph illustrating an embodiment of determining a movement distance of a signal using a reflected signal in an electronic device according to an embodiment, and FIG. 10B is a diagram illustrating an embodiment of determining a movement distance of a signal using a reflected signal in an electronic device according to an embodiment.

Referring to FIG. 10A, the electronic device 700 (or the processor 710) according to an embodiment may control an mmWave communication module (e.g., the mmWave communication module 720 of FIG. 7) so that a first antenna array (e.g., the first antenna array 730 of FIG. 7) outputs a second signal.

According to an embodiment, the processor 710 may control the mmWave communication module 720 to identify a direction in which the first signal is received and to output the second signal in the same direction as the direction in which the first signal is received.

According to an embodiment, the processor 710 may control the mmWave module 720 to be operated in a full-duplexer mode so that the second antenna array 740 can receive a signal while the first antenna array 730 outputs the second signal.

According to an embodiment, the second antenna array 740 may receive a signal in which a portion of the output second signal is leaked while the second signal is output. This may be caused by self-interference.

According to an embodiment, the processor 710 may identify whether the second antenna array 740 receives a third signal. When the second antenna array 740 receives the third signal, the processor 710 may identify whether the third signal received by the second antenna array 740 is the second signal that is reflected by the external object 640. For example, the processor 710 may identify whether the third signal is the same signal as the second signal based on information included in the third signal (e.g., information indicating the device that transmitted the third signal or information indicating a time at which the third signal is transmitted). Thus, the third signal may be the reflected second signal. By way of another example, the processor 710 may identify whether the third signal is the same signal as the second signal by identifying a correlation value of the third signal and the second signal (e.g., identifying a channel impulse response (CIR)).

According to an embodiment, in response to receiving the third signal, the processor 710 may control the mmWave communication module 720 to identify the distance of a transmission path of the second signal based on the difference between the transmission time of the second signal and the reception time of the third signal. The transmission time of the second signal and the reception time of the third signal may be determined using a CIR value. The mmWave communication module 720 may include a channel estimation module, and may extract a channel impulse response (CIR) value by inputting the second signal and the third signal to the channel estimation module. The channel impulse response (CIR) value may be illustrated in the graph shown in FIG. 10A.

FIG. 10A is a graph showing a CIR value extracted by outputting the second signal five times. Referring to FIG. 10A, it can be seen that two peak values are shown.

According to an embodiment, a first peak 1010 may indicate the state where the signal in which a portion of the output second signal is leaked is received while the second signal is output. A second peak 1020 may indicate the state where the third signal, which is the reflected second signal, is received. The mmWave communication module 720 may determine the time corresponding to the first peak 1010 as the output time of the second signal, and may determine the time corresponding to the second peak 1020 as the reception time of the third signal.

According to an embodiment, the mmWave communication module 720 may determine the distance of the transmission path of the second signal based on the difference between the output time of the second signal and the reception time of the third signal. The mmWave communication module 720 may determine, as the distance of the transmission path of the second signal, half of the value obtained by multiplying the difference between the time at which the third signal is received and the time at which the second signal is transmitted by the transmission speed (e.g., $3*10^8$ m/s) of the second signal.

FIG. 10B is a diagram illustrating an embodiment in which the electronic device 700 according to an embodiment determines the distance of a transmission path of a second signal using the method shown in FIG. 10A.

Referring to FIG. 10B, the electronic device 700 may output the second signal in the same direction as the direction in which the first signal is received, and may receive the third signal when the second signal is reflected. The electronic device 700 (or the processor 710) may determine the distance of the transmission path of the second signal based on the difference between the output time of the second signal and the reception time of the third signal.

According to an embodiment, the electronic device 700 may output the second signal in the same direction as the reception direction of the first signal transmitted by the first external electronic device 620. The output second signal may be reflected by the first external electronic device 620 and may reach the electronic device 700 again. The electronic device 700 may receive the third signal obtained when the second signal is reflected, and may determine the distance 1030 of the transmission path of the second signal based on the difference between the output time of the second signal and the reception time of the third signal. The distance 1030 of the transmission path of the second signal may be half of the value obtained by multiplying the difference value between the output time of the second signal and the reception time of the third signal by the speed (e.g., $3*10^8$ m/s) of the signal.

According to an embodiment, the processor 710 may identify the difference value between the distance of the transmission path of the first signal and the distance 1030 of the transmission path of the second signal, and may identify whether the difference value is equal to or larger than (or exceeds) a designated value. In response to identifying that the difference value between the distance of the transmission path of the first signal and the distance 1030 of the transmission path of the second signal is equal to or smaller than (or is smaller than) the designated value, the processor 710 may determine that the transmission path of the first signal is an LoS path between the electronic device 700 and the first external electronic device 620. The fact that the transmission path of the first signal corresponds to the LoS signal may mean that the first signal transmitted by the first external electronic device 620 is not reflected by the external object 640 prior to reaching the electronic device 700.

According to an embodiment, the electronic device 700 may output the second signal in the same direction as the reception direction of the first signal transmitted by the second external electronic device 630. The output second signal may be reflected by the external object 640 prior to reaching the electronic device 700. The electronic device 700 may receive the third signal obtained when the second signal is reflected, and may determine the distance 1040 of the transmission path of the second signal based on a difference between the output time of the second signal and the reception time of the third signal.

According to an embodiment, the processor 710 may identify a difference value 1050 between the distance 970 of the transmission path of the first signal and the distance 1040 of the transmission path of the second signal, and may identify whether the difference value is equal to or larger than (or exceeds) a designated value. In response to identifying that the difference value between the distance 970 of the transmission path of the first signal and the distance 1040 of the transmission path of the second signal exceeds (or is equal to or larger than) the designated value, the processor 710 may determine that the transmission path 970 of the first signal is not an LoS path between the electronic device 700 and the second external electronic device 630. The fact that the transmission path of the first signal is not the LoS signal may mean that the first signal transmitted by the second external electronic device 630 is reflected by the external object 640 prior to reaching the electronic device 700.

In the above-described embodiment, the second signal is implemented separately from the first signal is output, and the third signal is obtained when the second signal is reflected and received. According to another embodiment, in operation 910, the electronic device 700 may determine whether the transmission path of the first signal is the LoS path between the electronic device 700 and the first external electronic device 620 based on a transmitted FTM request signal.

According to an embodiment, the electronic device 700 may transmit the FTM request signal to an external electronic device (e.g., the first external electronic device 620 or the second external electronic device 630), and may receive a signal obtained when the FTM request signal is reflected by an external object. The electronic device 700 may identify the movement distance of the FTM request signal based on the difference between the time at which the FTM request signal is transmitted and the time at which the signal obtained when the FTM request signal is reflected is received.

According to an embodiment, the processor 710 may control the mmWave module 720 to be operated in a full-duplexer mode so that the second antenna array 740 receives the corresponding reflected signal while the first antenna array 730 outputs the FTM request signal.

According to an embodiment, the FTM request signal may include a channel estimation field. The electronic device 700 (or the processor 710) may identify a channel impulse response based on data included in the channel estimation field, and may identify the time at which the FTM request signal is transmitted and the time at which the signal obtained when the FTM request signal is reflected is received based on the channel impulse response.

Figure 11:
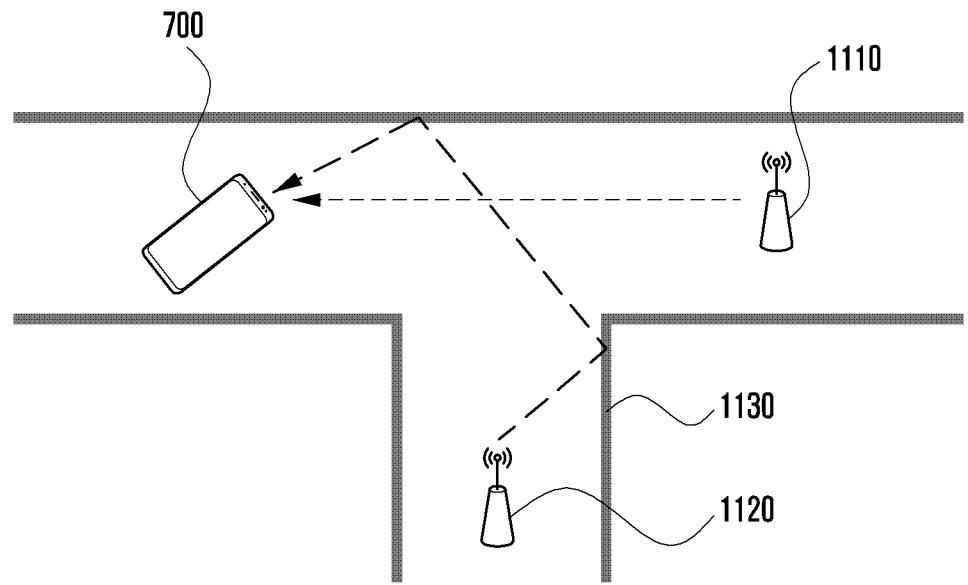
FIG. 11 is a diagram illustrating an embodiment in which an electronic device determines its position according to an embodiment.

FIG. 11 is a diagram illustrating an embodiment in which an electronic device determines its position according to an embodiment.

According to an embodiment, the electronic device 700 may be connected to an access point (AP) (e.g., a first AP 1110 or a second AP 1120) to determine the position of the electronic device 700 based on position information of the AP and relative position information between the electronic device 700 and the AP.

According to an embodiment, the electronic device 700 may determine the position of the electronic device 700 based on the position information of the AP in which an LoS path is generated with the electronic device 700 among the first AP 1110 or the second AP 1120, and the relative position information between the electronic device 700 and the AP.

According to an embodiment, the electronic device 700 may receive a first signal transmitted by the first AP 1110, and may identify the distance of a transmission path of the first signal based on the difference between the transmission time of the first signal and the reception time of the first signal. For example, the electronic device 700 may identify the distance of the transmission path of the first signal using the FTM scheme illustrated in FIG. 9A. The electronic device 700 may transmit a request signal of the first signal to the first AP 1110 to identify the distance of the transmission path of the first signal. The first AP 1110 may transmit the first signal to the electronic device 700 in response to receiving the request signal of the first signal. The first signal may include time information at which the first AP 1110 receives the request signal of the first signal. The electronic device 700 may determine the distance of the transmission path of the first signal based on the difference between the time at which the first AP 1110 receives the request signal of the first signal and the time at which the electronic device 700 receives the first signal.

According to an embodiment, the electronic device 700 may output a second signal, and may identify the distance of a transmission path of the second signal based on the difference between the reception time of a third signal obtained when the second signal is reflected by an external object (the first AP 1110) and the output time of the second signal. The electronic device 700 may determine that the transmission path of the first signal is an LoS path between the first AP 1110 and the electronic device 700 based on the difference between the distance of the transmission path of the first signal and the distance of the transmission path of the second signal.

According to an embodiment, the electronic device 700 may receive a first signal transmitted by the second AP 1120, and may identify the distance of a transmission path of the first signal based on the difference between the transmission time of the first signal and the reception time of the first signal. The electronic device 700 may output a second signal and may identify the distance of a transmission path of the second signal based on the difference between the reception time of a third signal obtained when the second signal is reflected by the external object 1130 and the output time of the second signal. The electronic device 700 may determine that the transmission path of the first signal is not the LoS path between the first AP 1110 and the electronic device 700 based on the difference between the distance of the transmission path of the first signal and the distance of the transmission path of the second signal.

According to an embodiment, the electronic device 700 may generate relative position information between the first AP 1110 and the electronic device 700 based on the distance (e.g., the distance of the transmission path of the first signal or the distance of the transmission path of the second signal) between the first AP 1110 and the electronic device 700 in which the LoS path is generated and an angle (e.g., AoA of the first signal) between the first AP and the electronic device 700. The electronic device 700 may determine the position of the electronic device 700 based on the position information of the first AP 1110 and the relative position information between the first AP 1110 and the electronic device 700.

FIGS. 12A-12D are diagrams illustrating an embodiment in which an electronic device according to an embodiment generates a map based on relative position information of the electronic device and an external electronic device.

Figure 12A:
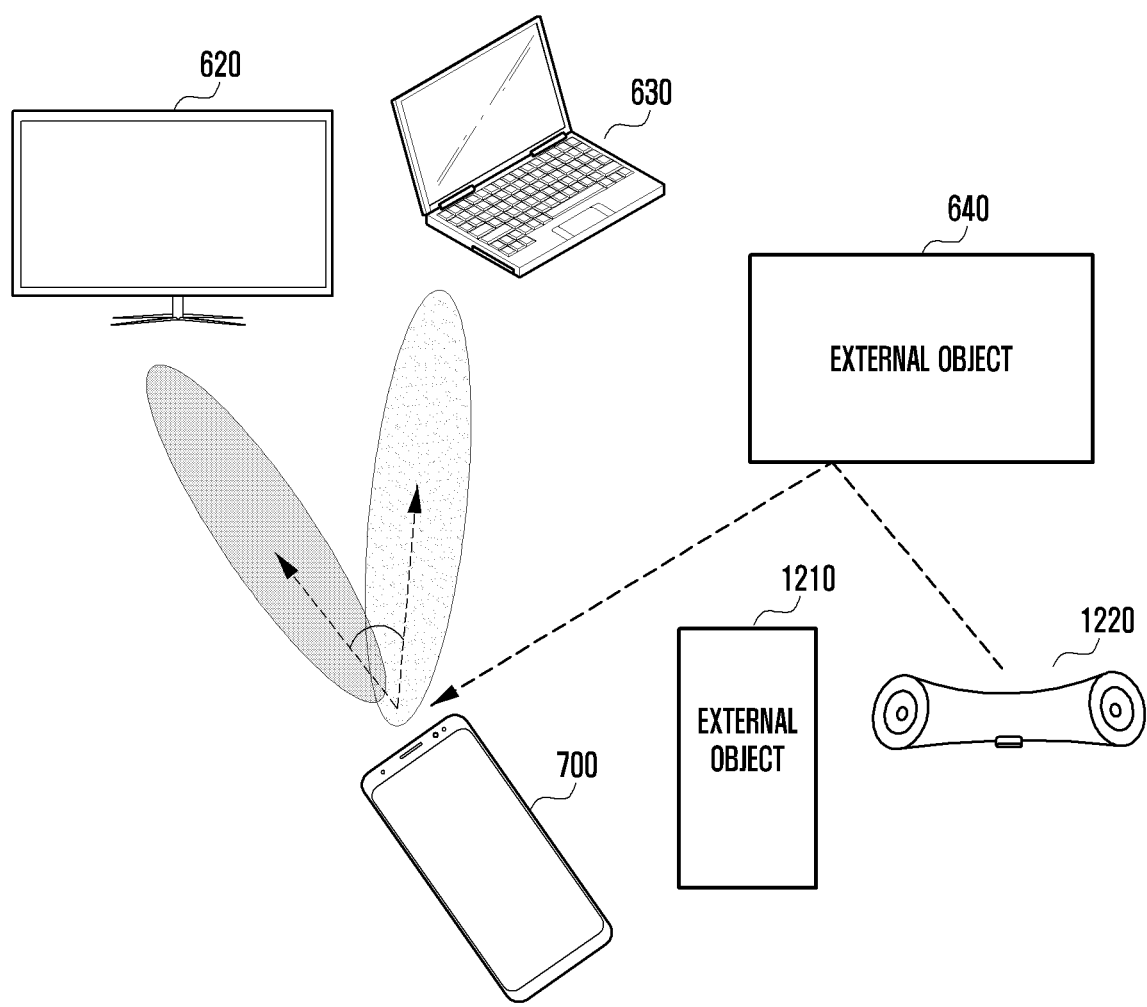
FIG. 12A is a diagram illustrating an embodiment in which an electronic device according to an embodiment generates a map based on relative position information of the electronic device and an external electronic device.

Referring to FIG. 12A, an electronic device (e.g., the electronic device 700 of FIG. 7) according to an embodiment may be connected to a first external electronic device (e.g., the first external electronic device 620 of FIG. 6), a second external electronic device (e.g., the second external electronic device 630 of FIG. 6), and a third external electronic device 1220 through a communication scheme to transmit/receive signals. For example, the communication scheme may be Wi-Fi in a band of 60 GHz defined in IEEE 802.11ad or IEEE 802.11 ay, D2D communication defined in the 5th generation cellular communication scheme having a frequency band of 30 GHz to 300 GHz, or UWB communication.

According to an embodiment, the electronic device 700 may use the above-described method to identify whether the transmission path of a signal generated between each of the first external electronic device 620, the second external electronic device 630, and the third external electronic device 1220 and the electronic device 700 is an LoS path. Referring to FIG. 12A, each of the transmission path of the signal between the first external electronic device 620 and the electronic device 700 and the transmission path of the signal between the second external electronic device 630 and the electronic device 700 may be the LoS path. The transmission path of the signal between the third external electronic device 1220 and the electronic device 700 may not be the LoS path. The transmission path of the signal between the third external electronic device 1220 and the electronic device 700 may be a path through which the signal is reflected by the external object 640 or 1210.

Figure 12B:
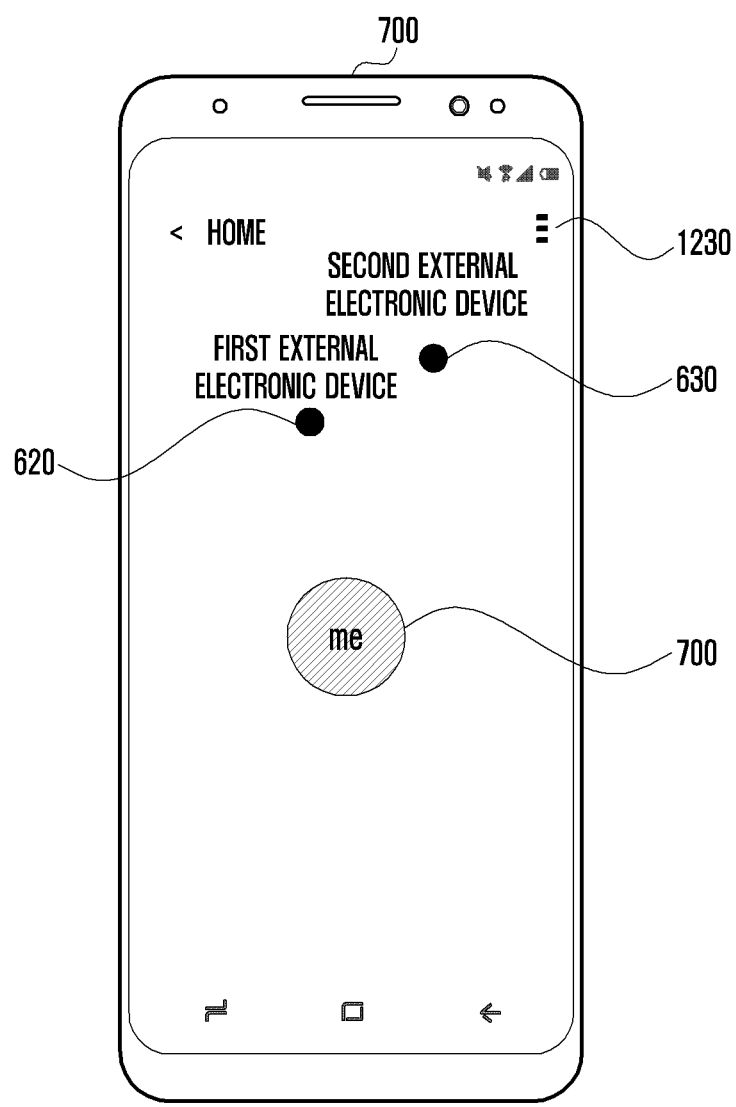
FIG. 12B is another diagram illustrating an embodiment in which an electronic device according to an embodiment generates a map based on relative position information of the electronic device and an external electronic device.

Referring to FIG. 12B, the electronic device 700 may determine position information of an external electronic device (e.g., the first external electronic device 620 and the second external electronic device 630) in which the LoS path is generated, and may generate a map 1230 based on the position information. The generated map may include the position of each of the electronic device 700, the first external electronic device 620, and the second external electronic device 630.

According to an embodiment, the electronic device 700 may request the position information of the third external electronic device 1220 in which the LoS path is not generated from another external electronic device (e.g., the second external electronic device 630) in which the LoS path is generated with the third external electronic device 1220.

Figure 12C:
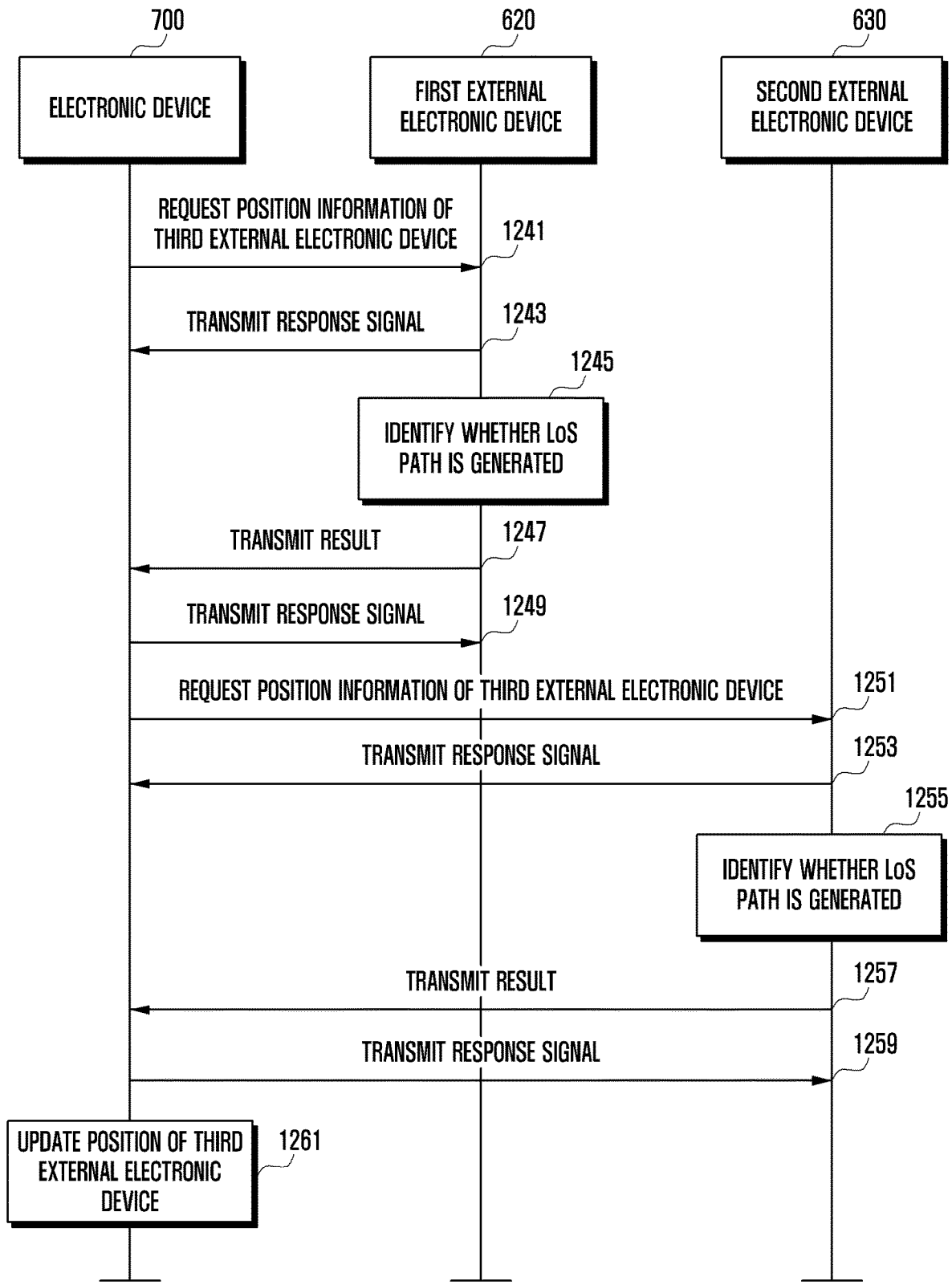
FIG. 12C is an operation flowchart illustrating operations in which an electronic device according to an embodiment acquires position information of another external electronic device in which the LoS path is not generated from another external electronic device.

FIG. 12C is an operation flowchart illustrating operations in which the electronic device 700 according to an embodiment acquires position information of another external electronic device (e.g., the third external electronic device 1220) in which the LoS path is not generated from another external electronic device.

According to an embodiment, in operation 1241, the electronic device 700 may transmit a signal requesting position information of the third external electronic device 1220 from the first external electronic device 620.

According to an embodiment, in operation 1243, the first external electronic device 620 may transmit a signal that responds to the signal requesting the position information of the third external electronic device 1220.

According to an embodiment, in operation 1245, the first external electronic device 620 may identify whether the LoS path is generated with the third external electronic device 1220.

According to an embodiment, the first external electronic device 620 may receive a first signal transmitted by the third external electronic device 1220, and may identify the distance of a transmission path of the first signal based on the difference between the transmission time of the first signal and the reception time of the first signal. For example, the first external electronic device 620 may identify the distance of the transmission path of the first signal by using the FTM scheme illustrated in FIG. 9A. The first external electronic device 620 may transmit a request signal of the first signal to the third external electronic device 1220 to identify the distance of the transmission path of the first signal. The third external electronic device 1220 may transmit the first signal to the electronic device 700 in response to receiving the request signal of the first signal. The first signal may include time information at which the third external electronic device 1220 receives the request signal of the first signal. The first external electronic device 620 may determine the distance of the transmission path of the first signal based on the difference between the time at which the third external electronic device 1220 receives the request signal of the first signal and the time at which the first external electronic device 620 receives the first signal.

According to an embodiment, the first external electronic device 620 may output a second signal, and may identify the distance of a transmission path of the second signal based on the difference between the reception time of a third signal obtained when the second signal is reflected by an external object and the output time of the second signal. The first external electronic device 620 may determine that the transmission path of the first signal is not the LoS path between the third external electronic device 1220 and the first external electronic device 620 based on the difference between the distance of the transmission path of the first signal and the distance of the transmission path of the second signal.

According to an embodiment, in operation 1247, the first external electronic device 620 may transmit the result as to whether the LoS path is generated.

Referring to FIG. 12A, the first external electronic device 620 may not generate the LoS path with the third external electronic device 1220 because the external object 1210 is in the way, and the result transmitted in operation 1247 may include information indicating that the LoS path cannot be generated.

According to an embodiment, in operation 1249, the electronic device 700 may receive the result and may transmit a response signal to the first external electronic device 620.

According to an embodiment, the electronic device 700 may broadcast a signal for finding an external electronic device that can generate the LoS path with the second external electronic device 630. The electronic device 700 may transmit, to an external electronic device (e.g., the first external electronic device 620) that responds to the broadcasted signal, a signal requesting information of the external electronic device (e.g., the second external electronic device 630) that can generate the LoS path with the first external electronic device 620. The first external electronic device 620 may transmit the information of the second external electronic device 630 in which the LoS path is generated with the first external electronic device 620, to the electronic device 700.

According to an embodiment, in operation 1251, the electronic device 700 may transmit a signal requesting position information of the third external electronic device 1220 to the second external electronic device 630.

According to an embodiment, in operation 1253, the second external electronic device 630 may transmit a signal that responds to the signal requesting the position information of the third external electronic device 1220.

According to an embodiment, in operation 1255, the second external electronic device 630 may identify whether the LoS path is generated with the third external electronic device 1220. The second external electronic device 630 may identify whether the LoS path is generated with the third external electronic device 1220 by using the FTM scheme described in FIG. 9A or the CIR scheme described in FIG. 10A.

Referring to FIG. 12A, it can be seen that the second external electronic device 630 can generate the LoS path with the third external electronic device 1220. The second external electronic device 630 may generate relative position information between the third external electronic device 1220 and the second external electronic device 630.

According to an embodiment, in operation 1257, the second external electronic device 630 may transmit a result including the relative position information between the third external electronic device 1220 and the second external electronic device 630 to the electronic device 700.

According to an embodiment, in operation 1259, the electronic device 700 may transmit a response signal to the second external electronic device 630 in response to receiving the result.

According to an embodiment, in operation 1261, the electronic device 700 may update the position of the third external electronic device 1220 based on the relative position information between the third external electronic device 1220 and the second external electronic device 630. For example, the electronic device 700 may estimate the distance and direction from the third external electronic device 1220.

According to an embodiment, the electronic device 700 may determine the LoS path between the electronic device 700 and the third external electronic device 1220 based on the position of the third external electronic device 1220. For example, the electronic device 700 may identify the LoS path with the third external electronic device 1220 periodically or based on the occurrence of an event (e.g., data transmission). According to an embodiment, the electronic device 700 may transmit a second signal through the LoS path determined based on information received from an external electronic device (e.g., the first external electronic device 620 or the second external electronic device 630). The electronic device 700 may identify whether an external object exists in the LoS path based on a difference between the transmission time of the second signal and the reception time of the third signal obtained when the second signal is reflected by the external object. In response to identifying that the external object does not exist in the LoS path, the electronic device 700 may generate a communication channel using the LoS path between the electronic device 700 and the third external electronic device 1220.

Figure 12D:
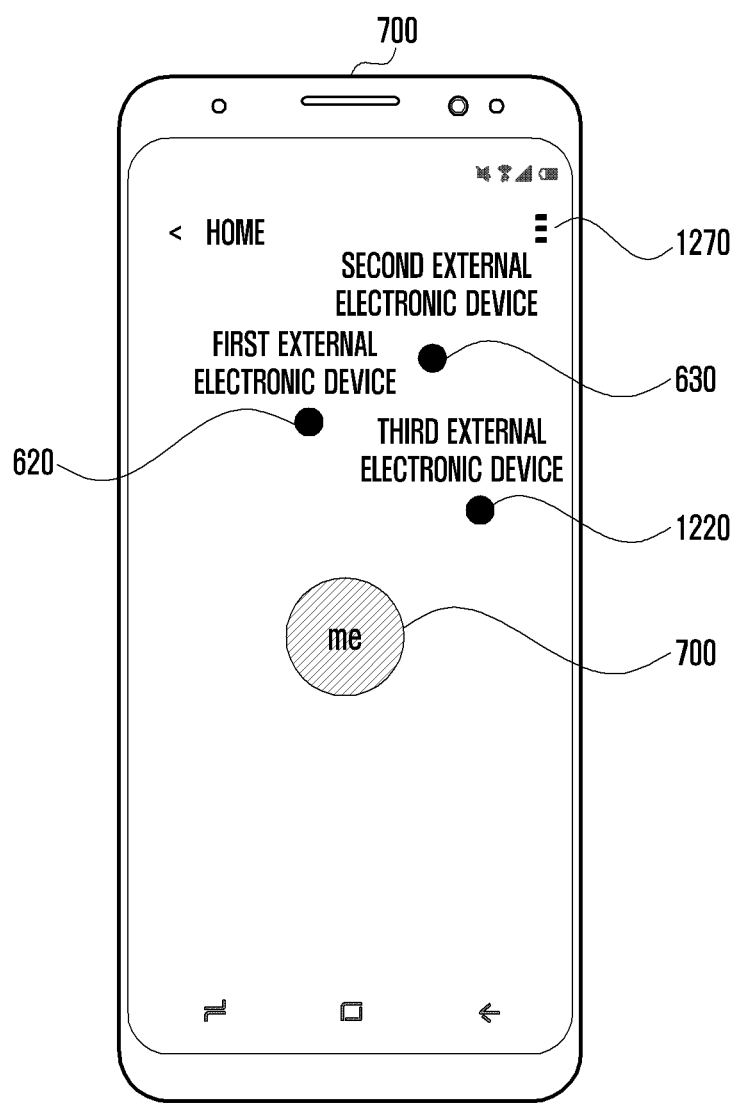
FIG. 12D illustrates a map in which the position of a third external electronic device is added to the map illustrated in FIG. 12B.

FIG. 12D illustrates a map 1270 in which the position of the third external electronic device 1220 is added to the map illustrated in FIG. 12B.

According to an embodiment, the electronic device 700 may generate position information of another external electronic device (e.g., the third external electronic device 1220) in which the LoS path is not generated with the electronic device 700 through the method described in FIGS. 12A to 12D. The map shown in FIG. 12D may be generated by an application of the electronic device 700. Using this application, the user of the electronic device 700 may control the three external electronic devices.

Figure 13:
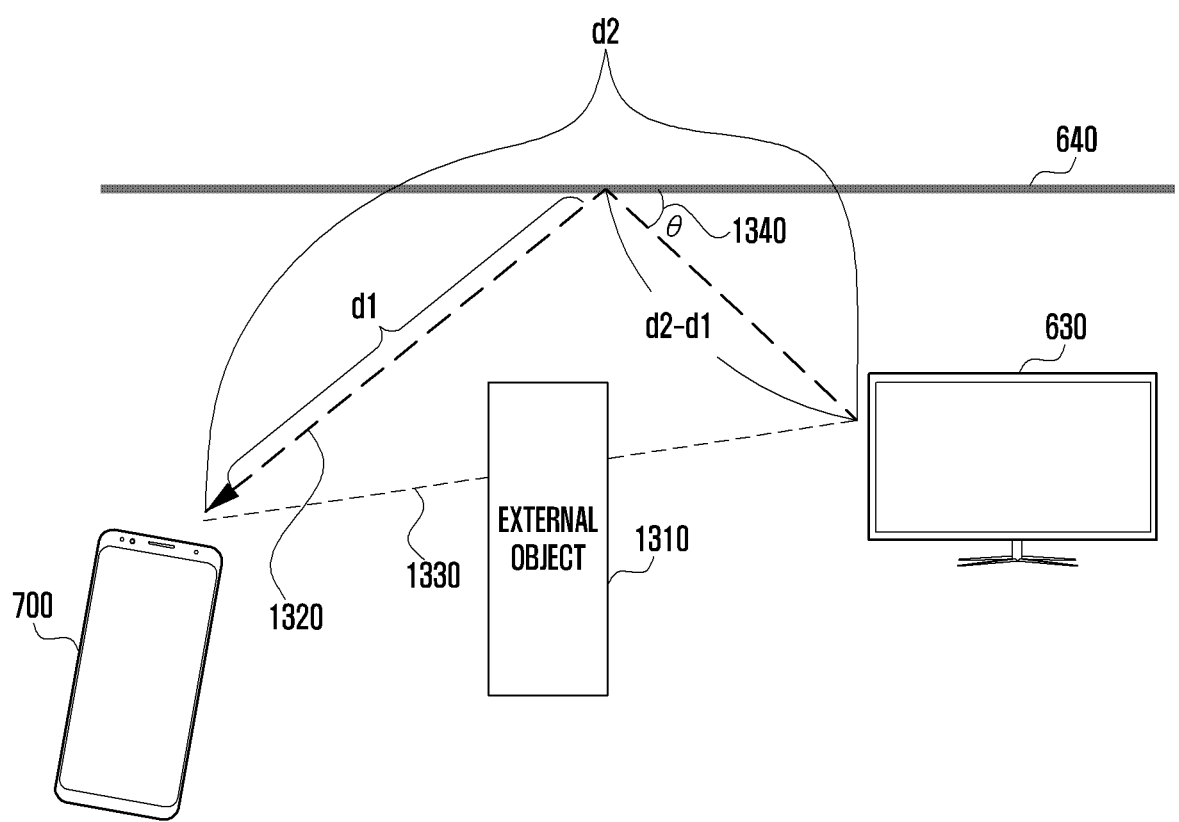
FIG. 13 is a diagram illustrating an embodiment in which an electronic device according to an embodiment detects whether an obstacle existing in an LoS path between the electronic device and an external electronic device is removed.

FIG. 13 is a diagram illustrating an embodiment in which an electronic device according to an embodiment detects whether an obstacle existing in an LoS path between the electronic device and an external electronic device is removed.

An electronic device (e.g., the electronic device 700 of FIG. 7) (or the processor 710) according to an embodiment may output a second signal in the same direction as the direction in which a first signal transmitted by a second external electronic device (e.g., the second electronic device 630 of FIG. 6) is received. The output second signal may be reflected by the external object 640 and then may reach the electronic device 700. This may be referred to as a third signal. The electronic device 700 may determine the distance d1 of a transmission path of the second signal based on the difference between the output time of the second signal and the reception time of the third signal.

According to an embodiment, the electronic device 700 (or the processor 710) may identify the difference value (d2−d1) between the distance d2 of a transmission path 1320 of the first signal and the distance d1 of a transmission path of the second signal, and may identify whether the difference value is equal to or larger than (or exceeds) a designated value. In response to identifying that the difference value d2−d1 exceeds (or equal to or larger than) the designated value, the electronic device 700 (or the processor 710) may determine that the transmission path 1320 of the first signal is not an LoS path 1330 between the electronic device 700 and the second external electronic device 630. The fact that the transmission path 1320 of the first signal is not the LoS path 1330 may mean that the first signal is reflected by the external object 640 prior to reaching the electronic device 700.

Referring to FIG. 13, for example, the LoS path 1330 between the electronic device 700 and the second external electronic device 630 may be blocked by the external object 1310. Due to the presence of the external object 1310, the electronic device 700 may perform communication with the second external electronic device 630 through the transmission path 1320 of the first signal, which is not the LoS path 1330.

According to an embodiment, the electronic device 700 (or the processor 710) may periodically identify whether the external object 1310 in the LoS path 1330 is present.

According to an embodiment, the electronic device 700 (or the processor 710) may determine a range of positions of the external electronic device 630 which can be predicted based on the distance d2 of the transmission path of the first signal and the AoA of a signal transmitted by the external electronic device 630. The electronic device 700 (or the processor 710) may output the second signal in a specific range from the AoA (e.g., a range between AoA of +5 degrees and AoA of −5 degrees), and may estimate the shape of the external object 640 based on the third signal obtained when the second signal is reflected by the external object 640. The electronic device 700 (or the processor 710) may narrow the predicted range of the positions of the external electronic device 630 based on the shape of the external object 640 and the initial predicted positions of the external electronic device 630.

According to an embodiment, the electronic device 700 (or the processor 710) may identify whether the external object 1310 exists by outputting the second signal in the narrowed range of the positions, may receive the third signal obtained when the second signal is periodically output and reflected, and may identify whether the external object 1310 is removed based on characteristics of the third signal (e.g., difference between the output time of the second signal and the reception time of the third signal).

According to another embodiment, when the LoS path between the electronic device 700 and the external electronic device 630 is generated and then the external object 1310 is added in the LoS path, the electronic device 700 (or the processor 710) may receive the third signal obtained when the second signal is periodically output and reflected in the direction corresponding to the LoS path between the external electronic device 630 and the electronic device 700, and may identify whether the external object 1310 is later removed based on the characteristics of the third signal (e.g., difference between the output time of the second signal and the reception time of the third signal).

According to an embodiment, in response to identifying that the external object 1310 is removed, the electronic device 700 (or the processor 710) may transmit and receive signals to and from the second external electronic device 630 through the LoS path 1330.

According to an embodiment, the electronic device 700 may output the second signal and may receive the third signal, which is the second signal reflected by the external object. The electronic device 700 may identify whether the external object exists (or whether the external object is removed) from the LoS path 1330 based on the third signal.

According to an embodiment, the electronic device 700 may perform sector sweep. The direction 1340 in which the second signal is output may be periodically changed, and the electronic device 700 may identify whether the second external electronic device 630 transmits a signal that responds to the sector sweep. The electronic device 700 may receive the signal that responds to the sector sweep, and may change the transmission path of the signal in response to identifying that the signal quality of the signal transmitted and received between the second external electronic device 630 and the electronic device 700 is higher than that in the transmission path 1320 of the first signal. The electronic device 700 (or the processor 710) may change the period in which the second signal is output in response to determining that the transmission path 1320 of the first signal is not the LoS path 1330. For example, the electronic device 700 (or the processor 710) may reduce the designated period in response to determining that the transmission path 1320 of the first signal is not the LoS path 1330. By reducing the designated period, the LoS path may be found relatively quickly.

According to an embodiment, the electronic device 700 (or the processor 710) may output the second signal in various directions to identify whether the external object exists and the position of the external object. The electronic device 700 (or the processor 710) may determine a range of directions in which the communication signal with an external electronic device is to be transmitted based on the output of the second signal and the reception of the third signal obtained when the second signal is reflected by the external object. The electronic device 700 (or the processor 710) may transmit the communication signal within the determined range, and may determine whether the transmission path of the communication signal is the LoS path based on the difference between the distance of the transmission path of the communication signal and the distance of the transmission path of the second signal. Thus, the electronic device 700 may use the LoS path based on the second signal as the beamforming direction of the first signal.

The electronic device 700 according to an embodiment may include the mmWave communication module 720 performing first communication with the first external electronic device 630 using a first communication scheme, the first antenna array 730 in which antennas outputting signals of the first communication scheme are arranged, the second antenna array 740 in which antennas receiving signals of the first communication scheme are arranged, and the processor 710. The processor 710 may be configured to receive the first signal transmitted by the first external electronic device 630, to identify the distance of the transmission path of the first signal based on time information included in the first signal, to transmit the second signal by using the first antenna array 730, to receive the third signal obtained when the second signal is reflected using the second antenna array 740, to identify the distance of the transmission path of the second signal based on the difference between the transmission time of the second signal and the reception time of the third signal, and to determine whether the transmission path of the first signal is the LoS path between the electronic device 700 and the first external electronic device 630 based on the difference between the distance of the transmission path of the first signal and the distance of the transmission path of the second signal.

In the electronic device 700 according to an embodiment, the processor 710 may be configured to determine that the transmission path of the first signal is the LoS path between the electronic device 700 and the first external electronic device 630 in response to identifying that the difference between the distance of the transmission path of the first signal and the distance of the transmission path of the second signal is equal to or less than a designated distance.

In the electronic device 700 according to an embodiment, the processor 710 may be configured to determine the designated distance based on a state of the first communication.

In the electronic device 700 according to an embodiment, the processor 710 may be configured to identity the reception time of the third signal.

In the electronic device 700 according to an embodiment, the processor 710 may be configured to identify a direction of a beam provided between the electronic device 700 and the first external electronic device 630 using the first communication scheme, and to request a transmission of the first signal from the first external electronic device 630 in response to identifying that the identified direction of the beam is included in a designated range.

In the electronic device 700 according to an embodiment, the processor 710 may be configured to determine the distance of the transmission path of the first signal or the distance of the transmission path of the second signal to be a distance between the electronic device 700 and the first external electronic device 630 in response to identifying that the transmission path of the first signal is the LoS path between the electronic device 700 and the first external electronic device 630, and to generate relative position information between the electronic device 700 and the first external electronic device 630 based on the direction of the beam and the distance between the electronic device 700 and the first external electronic device 630.

In the electronic device 700 according to an embodiment, the processor 710 may be configured to execute an application for controlling the first external electronic device 630 in response to identifying that the transmission path of the first signal is the LoS path between the electronic device 700 and the first external electronic device 630, and to transmit a control signal generated through the application to the first external electronic device 630 using the first communication scheme.

In the electronic device 700 according to an embodiment, the processor 710 may be configured to search for the second external electronic device 630 that generates the LoS path with the first external electronic device 620 in response to identifying that the transmission path of the first signal is not the LoS path between the electronic device 700 and the first external electronic device 620, to receive relative position information between the first external electronic device 620 and the second external electronic device 630 from the second external electronic device 630, and to determine relative position information between the electronic device 700 and the first external electronic device 620 based on the relative position information between the first external electronic device 620 and the second external electronic device 630 and the relative position information between the electronic device 700 and the second external electronic device 630.

In the electronic device 700 according to an embodiment, the processor 710 may be configured to identify the LoS path between the electronic device 700 and the first external electronic device 620 based on the relative position information between the electronic device 700 and the first external electronic device 620, to identify whether the external object 1210 exists in the LoS path based on a signal transmitted through the LoS path, and to generate a communication channel using the LoS path in response to identifying that the external object 1210 does not exist in the LoS path.

The electronic device 700 according to an embodiment may include: the mmWave communication module 720 configured to perform first communication with the first external electronic device 630 using a first communication scheme; the first antenna array 730 in which antennas transmitting signals of the first communication scheme are arranged; the second antenna array 740 in which antennas receiving the signals of the first communication scheme are arranged; and the processor 710, and the processor 710 may be configured to transmit an FTM request signal requesting FTM by using the first antenna array 730, to receive a reflected signal obtained when the FTM request signal is reflected by the external object 640 by using the second antenna array 740, to identify a distance of a transmission path of the FTM request signal based on a difference between the transmission time of the FTM request signal included in the reflected signal and the reception time of the reflected signal, to receive a first signal that responds to the FTM request signal transmitted by the first external electronic device 630, to identify a distance of the transmission path of the first signal based on time information included in the first signal, and to determine whether the transmission path of the first signal is the LoS path between the electronic device 700 and the first external electronic device 630 based on a difference between the distance of the transmission path of the FTM request signal and the distance of the transmission path of the first signal.

In the electronic device 700 according to an embodiment, the processor 710 may be configured to control the mmWave communication module 720 to be operated in a full-duplex mode using the first antenna array 730 and the second antenna array 740 so that the mmWave communication module 720 receives the reflected signal obtained when the FTM request signal is reflected by the external object.

In the electronic device 700 according to an embodiment, the processor 710 may be configured to determine that the transmission path of the first signal is the LoS path between the electronic device 700 and the first external electronic device 630 in response to determining that the difference between the distance of the transmission path of the FTM request signal and the distance of the transmission path of the first signal is equal to or less than a designated distance.

In the electronic device 700 according to an embodiment, the processor 710 may be configured to identify a direction of a beam provided between the electronic device 700 and the first external electronic device 630 using the first communication scheme and to transmit the FTM request signal to the first external electronic device 630 in response to identifying that the identified direction of the beam is included in a designated range.

In the electronic device 700 according to an embodiment, the processor 710 may be configured to determine the distance of the transmission path of the first signal to be the distance between the electronic device 700 and the first external electronic device 630 in response to identifying that the transmission path of the first signal is the LoS path between the electronic device 700 and the first external electronic device 630, and to generate relative position information between the electronic device 700 and the first external electronic device 630 based on the direction of the beam and the distance between the electronic device 700 and the first external electronic device 630.

Figure 14:
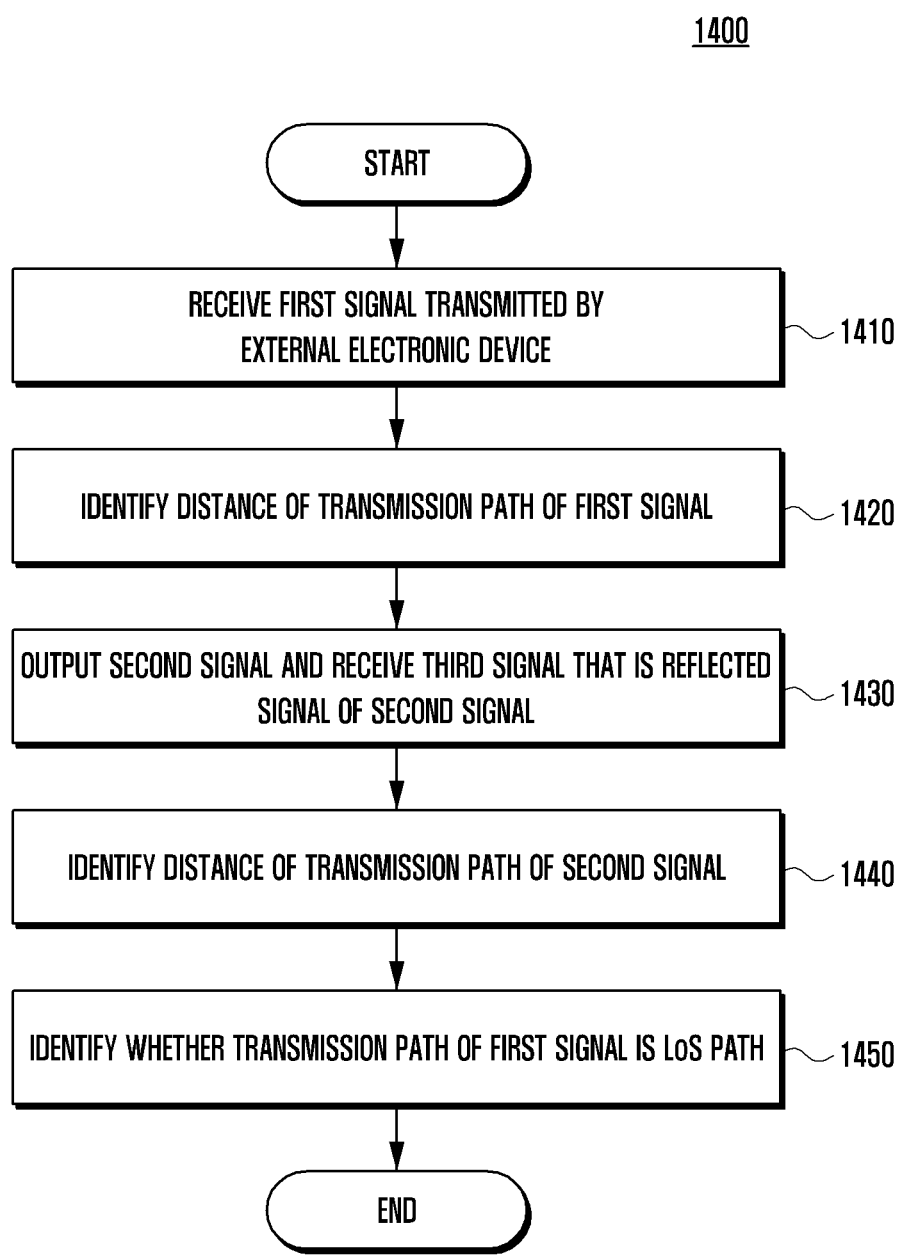
FIG. 14 is an operation flowchart illustrating an operation method of an electronic device according to an embodiment.

FIG. 14 is an operation flowchart illustrating an operation method 1400 of an electronic device according to an embodiment.

According to an embodiment, in operation 1410, an electronic device (e.g., the electronic device 700 of FIG. 7) may receive a first signal transmitted by an external electronic device (e.g., the first external electronic device 620 and the second external electronic device 630 of FIG. 6, or the third external electronic device 1220 of FIG. 12A).

According to an embodiment, in operation 1420, the electronic device 700 may identify the distance of the transmission path of the first signal.

According to an embodiment, the transmission path of the first signal may be the transmission path of a signal between the electronic device 700 and the external electronic device, and may be a straight path (e.g., 641 of FIG. 6) between the external electronic device and the electronic device 700 when the signal transmitted by the external electronic device is a wave propagated in a straight line that is not reflected by an external object (e.g., the external object 640 of FIG. 6). When the signal transmitted by the external electronic device is a wave reflected by the external object 640, the transmission path of the first signal may refer to a reflected path (e.g., 643 of FIG. 6) of the reflected signal. The reflected path is different from the straight path between the external electronic device and the electronic device 700.

According to an embodiment, the first signal may include information on the time at which the first signal is transmitted by the external electronic device. The electronic device 700 may identify information on the time at which the first signal is received and the time at which the first signal is transmitted, and may identify the distance of the transmission path of the first signal based on the difference between the time at which the first signal is received and the time at which the first signal is transmitted.

According to an embodiment, the distance of the transmission path of the first signal may be determined by multiplying the speed of the first FTM signal by half of the difference between a first difference value between a time t4 at which the external electronic device 900 receives a response signal and a time t1 at which the first FTM signal is transmitted, and a second difference value between a time t3 at which the electronic device 700 transmits the response signal and a time t2 at which the electronic device 700 receives the first FTM signal.

According to an embodiment, in operation 1430, the electronic device 700 may output a second signal, and may receive a third signal obtained when the second signal is reflected by an external object (e.g., the external object 640 of FIG. 6).

According to an embodiment, in operation 1440, the electronic device 700 may identify the distance of the transmission path of the second signal.

According to an embodiment, the electronic device 700 may control the mmWave communication module 720 to identify the distance of the transmission path of the second signal based on the difference between the transmission time of the second signal and the reception time of the third signal after receiving the third signal. The distance of the transmission path of the second signal may be defined as half of the value obtained by multiplying a transmission speed of the second signal (e.g., $3*10^8$ m/s) by the difference between the time at which the third signal is received by the electronic device 700 and the time at which the second signal is transmitted by the electronic device 700.

According to an embodiment, in operation 1450, the electronic device 700 may identify whether the transmission path of the first signal is an LoS path between the electronic device 700 and the external electronic device.

According to an embodiment, in response to identifying that the difference between the distance of the transmission path of the first signal and the distance of the transmission path of the second signal is equal to or less than (or is less than) a designated value, the electronic device 700 may determine the transmission path of the first signal to be the LoS path between the electronic device 700 and the external electronic device. The fact that the transmission path of the first signal corresponds to the LoS path may mean that the first signal transmitted by the external electronic device is not reflected by the external object 640 prior to reaching the electronic device 700.

According to an embodiment, in response to identifying that the difference between the distance of the transmission path of the first signal and the distance of the transmission path of the second signal exceeds (or is equal to or larger than) the designated value, the electronic device 700 may determine that the transmission path of the first signal is not the LoS path between the electronic device 700 and the external electronic device. The fact that the transmission path of the first signal is not the LoS path may mean that the first signal transmitted by the external electronic device is reflected by the external object 640 prior to reaching the electronic device 700.

Figure 15:
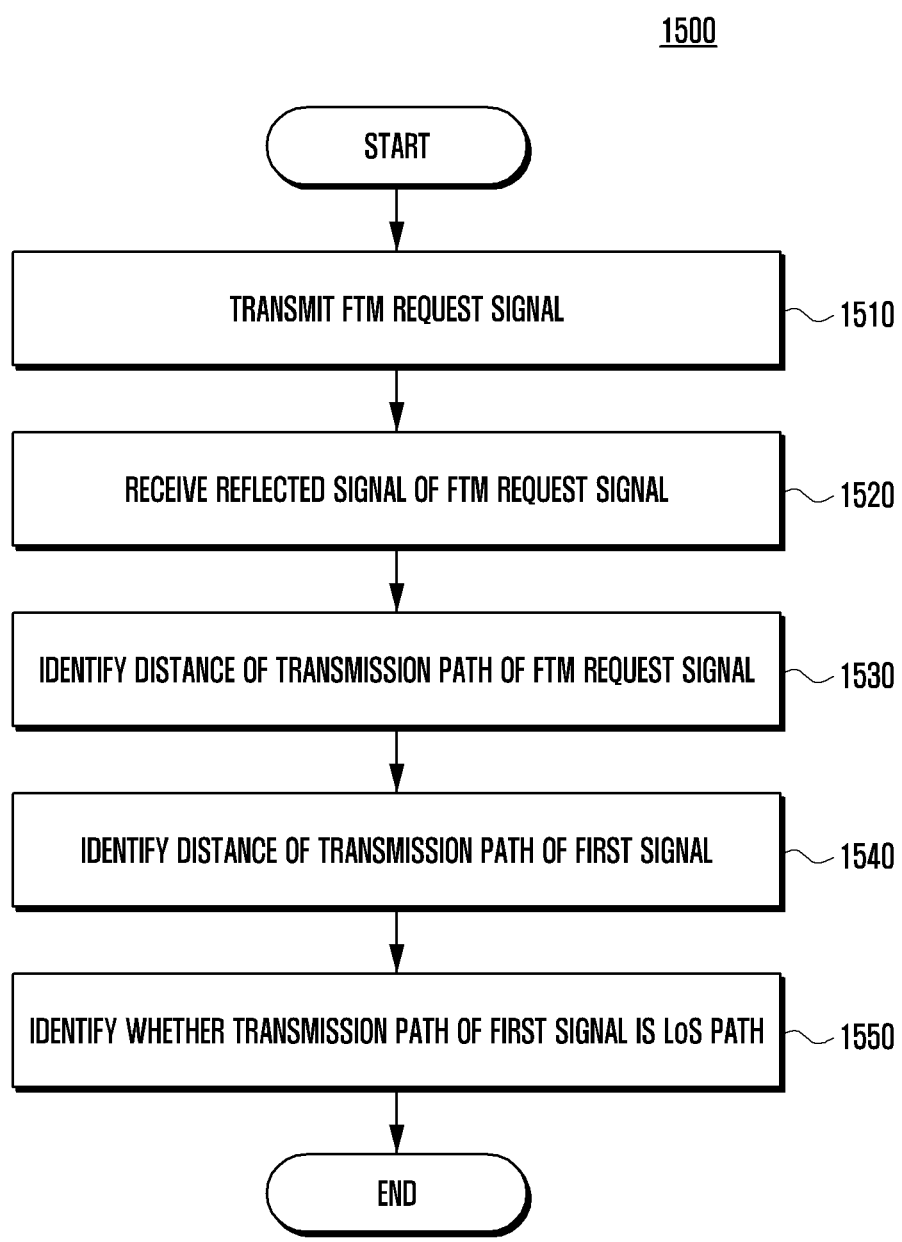
FIG. 15 is an operation flowchart illustrating an operation method of an electronic device according to another embodiment.

FIG. 15 is an operation flowchart illustrating an operation method of an electronic device according to another embodiment.

According to an embodiment, in operation 1510, an electronic device (e.g., the electronic device 700 of FIG. 7) may transmit an FTM request signal requesting FTM.

According to an embodiment, in operation 1520, the electronic device 700 may receive a reflected signal obtained when the FTM request signal is reflected by an external object (e.g., the external object 640 of FIG. 6).

According to an embodiment, the electronic device 700 may control an mmWave communication module (e.g., the mmWave communication module 720) to be operated in a full-duplexer mode so that a second antenna array (e.g., the second antenna array 740 of FIG. 7) can receive the reflected signal while a first antenna array (e.g., the first antenna array 730 of FIG. 7) outputs the FTM request signal.

According to an embodiment, in operation 1530, the electronic device 700 may identify the distance of the transmission path of the FTM request signal.

According to an embodiment, the FTM request signal may include a channel estimation field. The electronic device 700 (or the processor 710) may identify a channel impulse response based on data included in the channel estimation field, and may identify the time at which the FTM request signal is transmitted and the time at which the reflected signal obtained is received based on the channel impulse response.

According to an embodiment, the electronic device 700 may identify the distance of the transmission path of the FTM request signal based on the difference between the time at which the FTM request signal is transmitted and the time at which the reflected signal is received.

According to an embodiment, in operation 1540, the electronic device 700 may receive the first signal that responds to the reception of the FTM request signal by an external electronic device (e.g., the first external electronic device 620 and the second external electronic device 630 of FIG. 6 or the third external electronic device 1220 of FIG. 12A), and may identify the distance of the transmission path of the first signal.

According to an embodiment, the first signal may include information on the time at which the external electronic device transmits the first signal. The electronic device 700 may identify information on the time at which the electronic device 700 receives the first signal and the time at which the external electronic device transmits the first signal, and may identify the distance of the transmission path of the first signal based on the difference between the time at which the electronic device 700 receives the first signal and the time at which the external electronic device transmits the first signal. The distance of the transmission path of the first signal may be obtained by multiplying the difference between the time at which the electronic device 700 receives the first signal and the time at which the external electronic device transmits the first signal by the transmission speed (e.g., $3*10^8$ m/s) of the first signal.

According to an embodiment, in operation 1550, the electronic device 700 may identify whether the transmission path of the first signal is an LoS path based on the difference between the distance of the transmission path of the first signal and the distance of a transmission path of the FTM request signal.

According to an embodiment, the electronic device 700 may determine the transmission path of the first signal to be the LoS path between the electronic device 700 and the external electronic device in response to identifying that the difference between the distance of the transmission path of the first signal and the distance of the transmission path of the FTM request signal is equal to or less than (or is less than) a designated value. The fact that the transmission path of the first signal corresponds to the LoS path may mean that the first signal transmitted by the external electronic device is not reflected by the external electronic device 630 prior to reaching the electronic device 700.

According to an embodiment, the electronic device 700 may determine that the transmission path of the first signal is not the LoS path between the electronic device 700 and the external electronic device in response to identifying that the difference between the distance of the transmission path of the first signal and the distance of the transmission path of the FTM request signal exceeds (or is equal to or larger than) the designated value. The fact that the transmission path of the first signal is not the LoS path may mean that the first signal transmitted by the external electronic device is reflected by the external electronic device 630 prior to reaching the electronic device 700.

An operation method 1400 of an electronic device according to an embodiment may include operation 1410 of receiving a first signal transmitted by the first external electronic device 630; operation 1420 of identifying a distance of a transmission path of the first signal based on time information included in the first signal; operation 1430 of transmitting a second signal by using a first antenna array 730 and receiving a third signal obtained when the second signal is reflected using a second antenna array 740; operation 1440 of identifying a distance of a transmission path of the second signal based on a difference between a transmission time of the second signal and a reception time of the third signal; and operation 1450 of determining whether the transmission path of the first signal is an LoS path between the electronic device 700 and the first external electronic device 630 based on a difference between a distance of the transmission path of the first signal and a distance of the transmission path of the second signal.

In the operation method 1400 of the electronic device according to an embodiment, the transmission path of the first signal may be determined to be the LoS path between the electronic device 700 and the first external electronic device 630 when it is determined that the difference between the distance of the transmission path of the first signal and the distance of the transmission path of the second signal is equal to or less than the designated distance.

In the operation method 1400 of the electronic device according to an embodiment, the method may further include an operation of identifying the reception time of the third signal.

The operation method 1400 of the electronic device according to an embodiment may further include: an operation of identifying a direction of a beam provided between the electronic device 700 and the first external electronic device 630; and an operation of requesting transmission of the first signal from the first external electronic device 630 in response to identifying that the identified direction of the beam satisfies a designated condition.

The operation method 1400 of the electronic device according to an embodiment may further include: an operation of determining the distance of the transmission path of the first signal or the distance of the transmission path of the second signal to be a distance between the electronic device 700 and the first external electronic device 630 in response to identifying that the transmission path of the first signal is the LoS path between the electronic device 700 and the first external electronic device 630; and an operation of generating relative position information between the electronic device 700 and the first external electronic device 630 based on the direction of the beam and the distance between the electronic device 700 and the first external electronic device 630.

The operation method 1400 of the electronic device according to an embodiment may further include: an operation of searching for a second external electronic device 630 that forms the LoS path with the first external electronic device 620 in response to identifying that the transmission path of the first signal is not the LoS path between the electronic device 700 and the first external electronic device 620; an operation of receiving relative position information between the first external electronic device 620 and the second external electronic device 630 from the second external electronic device 630; and an operation of determining relative position information between the electronic device 700 and the first external electronic device 620 based on the relative position information between the first external electronic device 620 and the second external electronic device 630 and the relative position information between the electronic device 700 and the second external electronic device 630.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
   an mmWave communication module configured to perform first communication with a first external electronic device using a first communication scheme;
   a first antenna array in which antennas outputting signals of the first communication scheme are arranged;
   a second antenna array in which antennas receiving the signals of the first communication scheme are arranged; and
   a processor, wherein the processor is configured to:
      receive a first signal transmitted by the first external electronic device,
      identify a distance of a transmission path of the first signal based on time information included in the first signal,
      transmit a second signal by using the first antenna array,
      receive a third signal obtained when the second signal is reflected by using the second antenna array,
      identify a distance of a transmission path of the second signal based on a difference between a transmission time of the second signal and a reception time of the third signal, and
      determine whether the transmission path of the first signal is a line of sight (LoS) path between the electronic device and the first external electronic device based on a difference between the distance of the transmission path of the first signal and the distance of the transmission path of the second signal.

2. The electronic device of claim 1, wherein the processor is configured to determine that the transmission path of the first signal is the LoS path between the electronic device and the first external electronic device in response to determining that the difference between the distance of the transmission path of the first signal and the distance of the transmission path of the second signal is equal to or less than a designated distance.

3. The electronic device of claim 2, wherein the processor is configured to determine the designated distance based on a state of the first communication.

4. The electronic device of claim 1, wherein the processor is configured to identify a time at which at least a portion of the second signal is received using the second antenna array, and
   identify the distance of the transmission path of the second signal based on a difference of the reception time of the third signal and the time at which at least the portion of the second signal is received.

5. The electronic device of claim 1, wherein the processor is configured to:
   identify a direction of a beam provided between the electronic device and the first external electronic device using the first communication scheme, and
   request transmission of the first signal from the first external electronic device in response to identifying that the identified direction of the beam is included within a designated range.

6. The electronic device of claim 5, wherein the processor is configured to:
   determine that the distance of the transmission path of the first signal or the distance of the transmission path of the second signal is a distance between the electronic device and the first external electronic device in response to identifying that the transmission path of the first signal is the LoS path between the electronic device and the first external electronic device, and
   generate relative position information between the electronic device and the first external electronic device based on the direction of the beam and the distance between the electronic device and the first external electronic device.

7. The electronic device of claim 1, wherein the processor is configured to:
   execute an application for controlling the first external electronic device in response to identifying that the transmission path of the first signal is the LoS path between the electronic device and the first external electronic device, and
   transmit a control signal generated through the application to the first external electronic device using the first communication scheme.

8. The electronic device of claim 1, wherein the processor is configured to:
   search for a second external electronic device that forms the LoS path with the first external electronic device in response to identifying that the transmission path of the first signal is not the LoS path between the electronic device and the first external electronic device,
   receive relative position information between the first external electronic device and the second external electronic device from the second external electronic device, and
   determine the relative position information between the electronic device and the first external electronic device based on the relative position information between the first external electronic device and the second external electronic device and relative position information between the electronic device and the second external electronic device.

9. The electronic device of claim 8, wherein the processor is configured to:
   identify the LoS path between the electronic device and the first external electronic device based on the relative position information between the electronic device and the first external electronic device,
   identify whether an external object exists in the LoS path based on a signal transmitted through the LoS path, and
   generate a communication channel using the LoS path in response to identifying that the external object does not exist in the LoS path.

10. An electronic device comprising:
    an mmWave communication module configured to perform first communication with a first external electronic device using a first communication scheme;
    a first antenna array in which antennas transmitting signals of the first communication scheme are arranged;
    a second antenna array in which antennas receiving the signals of the first communication scheme are arranged; and
    a processor,
    wherein the processor is configured to:
       transmit a fine timing measurement (FTM) request signal requesting FTM by using the first antenna array,
       receive a reflected signal obtained when the FTM request signal is reflected by an external object, by using the second antenna array,
       identify a distance of a transmission path of the FTM request signal based on a difference between a transmission time of the FTM request signal included in the reflected signal and a reception time of the reflected signal, receive a first signal that responds to the FTM request signal transmitted by the first external electronic device and identify a distance of a transmission path of the first signal based on time information included in the first signal, and determine whether the transmission path of the first signal is an LoS path between the electronic device and the first external electronic device based on a difference between the distance of the transmission path of the FTM request signal and the distance of the transmission path of the first signal.

11. The electronic device of claim 10, wherein the processor is configured to control the mmWave communication module to be operated in a full-duplex mode using the first antenna array and the second antenna array so that the mmWave communication module receives the reflected signal obtained when the FTM request signal is reflected by the external object.

12. The electronic device of claim 10, wherein the processor is configured to determine that the transmission path of the first signal is the LoS path between the electronic device and the first external electronic device in response to determining that the difference between the distance of the transmission path of the FTM request signal and the distance of the transmission path of the first signal is equal to or less than a designated distance.

13. The electronic device of claim 10, wherein the processor is configured to:
identify a direction of a beam provided between the electronic device and the first external electronic device using the first communication scheme, and
transmit the FTM request signal to the first external electronic device in response to identifying that the identified direction of the beam is included in a designated range.

14. The electronic device of claim 13, wherein the processor is configured to:
determine the distance of the transmission path of the first signal to be a distance between the electronic device and the first external electronic device in response to identifying that the transmission path of the first signal is the LoS path between the electronic device and the first external electronic device, and
generate relative position information between the electronic device and the first external electronic device based on the direction of the beam and the distance between the electronic device and the first external electronic device.

15. An operation method of an electronic device, comprising:
receiving a first signal transmitted by a first external electronic device;
identifying a distance of a transmission path of the first signal based on time information included in the first signal;
transmitting a second signal by using a first antenna array;
receiving a third signal obtained when the second signal is reflected by using a second antenna array;
identifying a distance of a transmission path of the second signal based on a difference between a transmission time of the second signal and a reception time of the third signal; and
determining whether the transmission path of the first signal is an LoS path between the electronic device and the first external electronic device based on a difference between a distance of the transmission path of the first signal and a distance of the transmission path of the second signal.

16. The operation method of claim 15, wherein the transmission path of the first signal is determined to be the LoS path between the electronic device and the first external electronic device when it is determined that the difference between the distance of the transmission path of the first signal and the distance of the transmission path of the second signal is equal to or less than a designated distance.

17. The operation method of claim 15, further comprising: identifying the reception time of the third signal.

18. The operation method of claim 15, further comprising:
identifying a direction of a beam provided between the electronic device and the first external electronic device; and
requesting transmission of the first signal from the first external electronic device in response to identifying that the identified direction of the beam satisfies a designated condition.

19. The operation method of claim 18, further comprising:
determining the distance of the transmission path of the first signal or the distance of the transmission path of the second signal to be a distance between the electronic device and the first external electronic device in response to identifying that the transmission path of the first signal is the LoS path between the electronic device and the first external electronic device; and
generating relative position information between the electronic device and the first external electronic device based on the direction of the beam and the distance between the electronic device and the first external electronic device.

20. The operation method of claim 18, further comprising:
searching for a second external electronic device that forms the LoS path with the first external electronic device in response to identifying that the transmission path of the first signal is not the LoS path between the electronic device 700 and the first external electronic device;
receiving relative position information between the first external electronic device and the second external electronic device from the second external electronic device; and
determining relative position information between the electronic device and the first external electronic device based on the relative position information between the first external electronic device and the second external electronic device and the relative position information between the electronic device and the second external electronic device.

* * * * *